United States Patent
Shirai et al.

(10) Patent No.: US 8,965,197 B2
(45) Date of Patent: Feb. 24, 2015

(54) METHOD OF SWITCHING OPTICAL TRANSPORT NETWORK AND NODE DEVICE

(75) Inventors: Katsuhiro Shirai, Kawasaki (JP); Koji Takeguchi, Kawasaki (JP); Takashi Honda, Kawasaki (JP); Masahiro Shioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 13/532,047

(22) Filed: Jun. 25, 2012

(65) Prior Publication Data

US 2012/0263452 A1 Oct. 18, 2012

Related U.S. Application Data

(63) Continuation of application No. PCT/JP2009/071780, filed on Dec. 28, 2009.

(51) Int. Cl.
*H04B 10/00* (2013.01)
*H04L 12/437* (2006.01)
*H04B 10/275* (2013.01)
(Continued)

(52) U.S. Cl.
CPC .......... *H04L 12/437* (2013.01); *H04B 10/275* (2013.01); *H04J 3/085* (2013.01); *H04L 12/40182* (2013.01); *H04J 3/1652* (2013.01);
(Continued)

(58) Field of Classification Search
USPC ............................................ 398/1–38, 45–59
See application file for complete search history.

(56) References Cited

U.S. PATENT DOCUMENTS 5,532,862 A * 7/1996 Tada et al. .................... 398/4
6,201,788 B1 3/2001 Ishiwatari
(Continued)

FOREIGN PATENT DOCUMENTS

JP 10-313332 11/1998
JP 2001-186160 7/2001
(Continued)

OTHER PUBLICATIONS

Patent Abstracts of Japan, Publication No. 2001-186160, Published Jul. 6, 2001.
(Continued)

*Primary Examiner* — Li Liu
(74) *Attorney, Agent, or Firm* — Staas & Halsey LLP

(57) ABSTRACT

A node device in an optical transport ring network including plural node devices connected in a ring form using plural optical transmission paths so that optical transport frames of a working line and a protection line are transmitted using the plural optical transmission paths, includes a control information transmitter, when a failure occurs in the optical transmission paths, transmitting the optical transport frame to an opposing node device as a transmission destination node in the optical transmission paths, the optical transport frame including switching control information; and a switcher receiving the optical transport frame including switching control information, the optical transport frame being transmitted to the node device as the transmission destination node, forming a loop back to fold a transmission path between the plural optical transmission paths, and switching the optical transmission path from the work line to the protection line.

4 Claims, 26 Drawing Sheets

(51) Int. Cl.
*H04J 3/08* (2006.01)
*H04L 12/40* (2006.01)
*H04J 3/16* (2006.01)

(52) U.S. Cl.
CPC .... *H04J 2203/006* (2013.01); *H04J 2203/0082* (2013.01)
USPC ............. 398/3; 398/4; 398/1; 398/2; 398/45; 398/59

(56) References Cited

U.S. PATENT DOCUMENTS

| | | | |
|---|---|---|---|
| 6,625,115 B1 * | 9/2003 | Ikeda et al. | 370/217 |
| 6,643,041 B1 * | 11/2003 | Ikeda et al. | 398/79 |
| 6,795,394 B1 * | 9/2004 | Swinkels et al. | 370/222 |
| 6,879,558 B1 * | 4/2005 | Honda et al. | 370/222 |
| 6,895,182 B1 * | 5/2005 | Moriyama et al. | 398/3 |
| 7,330,424 B2 * | 2/2008 | Nagamine et al. | 370/217 |
| 2002/0012318 A1 * | 1/2002 | Moriya et al. | 370/225 |
| 2002/0039348 A1 * | 4/2002 | Honda et al. | 370/222 |
| 2002/0191538 A1 * | 12/2002 | Ono | 370/222 |
| 2003/0223745 A1 | 12/2003 | Tomofuji et al. | |

FOREIGN PATENT DOCUMENTS

| | | |
|---|---|---|
| JP | 2001-197011 | 7/2001 |
| JP | 2003-46522 | 2/2003 |
| JP | 2004-007064 | 1/2004 |

OTHER PUBLICATIONS

Patent Abstracts of Japan, Publication No. 2004-007064, Published Jan. 8, 2004.
Patent Abstracts of Japan, Publication No. 2001-197011, Published Jul. 19, 2001.
International Search Report dated Jan. 26, 2010 in PCT/JP2009/071780.

* cited by examiner

FIG.3

| Byte1 | | | Byte2 | Byte3 | Byte4 | |
|---|---|---|---|---|---|---|
| bit1-4 | bit5-8 | | bit1-8 | bit1-8 | bit1-3 | bit4-8 |
| Request | bit5: short/long | bit6-8: Status | Requested NOde ID | Source NOde ID | Source NOde Information | Reserved |

| Byte1 Bit1-4 | | CONTENTS | Note |
|---|---|---|---|
| | 1111 | LP-S(Lockout of Protection(Span)) or SF-P(Signal Fail (Protection)) | PREVENT SWITCHING FROM WORKING CHANNEL TO PROTECTION LINE |
| | 1110 | FS-S(Forced Switch(Span)) | FORCED SWITCH IN CASE PROTECTION SYSTEM IS NORMAL, SWITCH TRAFFIC FROM WORK SYSTEM TO PROTECTION SYSTEM BY EXTERNAL CONTROL |
| | 1101 | FS-R(Forced Switch(Ring)) | |
| | 1100 | SF-S(Signal Fail(Span)) | AUTO SWITCH - TRANSMISSION PATH FAILURE (SIGNAL FAIL) IN CASE PROTECTION SYSTEM IS NORMAL, WHEN LOS, LOF, MS-AIS, AND IN-DEVICE MONITOR ABNORMALITY ARE DETECTED, SWITCH TRAFFIC FROM WORK SYSTEM TO PROTECTION SYSTEM |
| | 1011 | SF-R(Signal Fail(Ring)) | |
| | 1010 | SD-P(Signal Degrade(Protection)) | AUTO SWITCH - QUALITY DEGRADATION (SIGNAL DEGRADE) IN CASE PROTECTION SYSTEM IS NORMAL, WHEN DEGRADATION OF ERROR RATE IS DETECTED, SWITCH TRAFFIC FROM WORK SYSTEM TO PROTECTION SYSTEM |
| | 1001 | SD-S(Signal Degrade(Span)) | |
| | 1000 | SD-R(Signal Degrade(Ring)) | |
| | 0111 | MS-S(Manual Switch(Span)) | SWITCH FROM WORKING CHANNEL TO PROTECTION LINE HOWEVER, ONLY EXECUTABLE WHEN NO LINE FAILURE OCCURS |
| | 0110 | MS-R(Manual Switch(Ring)) | |
| | 0101 | WTR(Wait to Restore) | RESTORATION WAIT (WAIT TO RESTORE) AFTER FAILURE IS RESTORED, DO NOT CHANGE NAME OF TRANSMISSION PATH WITHIN RESTORATION WAIT PROTECTION PERIOD |
| | 0100 | EXER-S(Exerciser(Span)) | PERFORM PSEUDO SWITCHING TO PROTECTION LINE HOWEVER, PREVENT SWITCHING WHILE REQUEST HAVING HIGHER PRIORITY SUCH AS LINE FAILURE IS PERFORMED |
| | 0011 | EXER-R(Exerciser(Ring)) | |
| | 0010 | RR-S(Reverse Request(Span)) | SWITCH RESPONSE (REVERSE REQUEST) IN RESPONSE TO SWITCHING REQUEST FROM OPPOSING SIDE REPORT EXECUTION OF SWITCHING TO OPPOSING SIDE |
| | 0001 | RR-R(Reverse Request(Ring)) | |
| | 0000 | NR(NO Request) | NO SWITCHING (NO BRIDGE REQUIRED) NO REQUEST TO SWITCH FROM WORK LINE CHANGE NAME OF TRANSMISSION PATH OR SWITCH BACK |

| | | CONTENTS | Note |
|---|---|---|---|
| Byte1 Bit6-8 | 111 | Line AIS (Alarm Indication Signal) | STATE OF REPORTING OCCURRENCE OF FAILURE TO DOWNSTREAM DIRECTION |
| | 110 | Line RDI (Remote Defect Indicator) | STATE OF REPORTING FAILURE TO UPSTREAM DIRECTION |
| | 101 | Reserved for future use | NOT DEFINED |
| | 100 | Reserved for future use | NOT DEFINED |
| | 011 | ET(Extra Traffic) on Protection Channel | IDLE STATE AND STATE WHERE CROSS-CONNECTION IS SET AND USED IN PROTECTION LINE |
| | 010 | Bridged and Switched(Br&Sw) | RING SWITCHING AND SPAN SWITCHING STATE STATE WHERE SAME SIGNAL IS TRANSMITTED IN BOTH WORK LINE AND PROTECTION LINE AND RECEPTION FROM PROTECTION LINE IS SELECTED AS RECEPTION FROM OTHER END |
| | 001 | Bridged(Br) | STATE WHERE SAME SIGNAL IS TRANSMITTED IN WORK LINE AND PROTECTION LINE DURING PROCESS OF RING SWITCHING AND SPAN SWITCHING |
| | 000 | Idle | STATE WHERE NEITHER RING SWITCHING NOR SPAN SWITCHING IS PERFORMED |

FIG.6

| | | CONTENTS | Note |
|---|---|---|---|
| Byte4 bit1 | 1 | Enhanced BLSR | MODE IN BLSR OPERATION IN THIS EMBODIMENT |
| | 0 | Traditional BLSR | MODE NOT CORRESPONDING TO BLSR OPERATION IN THIS EMBODIMENT |
| Byte4 Bit2-3 | 11 | Work & Protection | CROSS-CONNECTION EXISTS IN WORK & PROTECTION LINES |
| | 10 | Work | CROSS-CONNECTION EXISTS IN WORK LINE ONLY |
| | 01 | Protection | CROSS-CONNECTION EXISTS IN PROTECTION LINE ONLY |
| | 00 | NOne | NO CROSS-CONNECTION EXIST IN BOTH WORK & PROTECTION LINES |

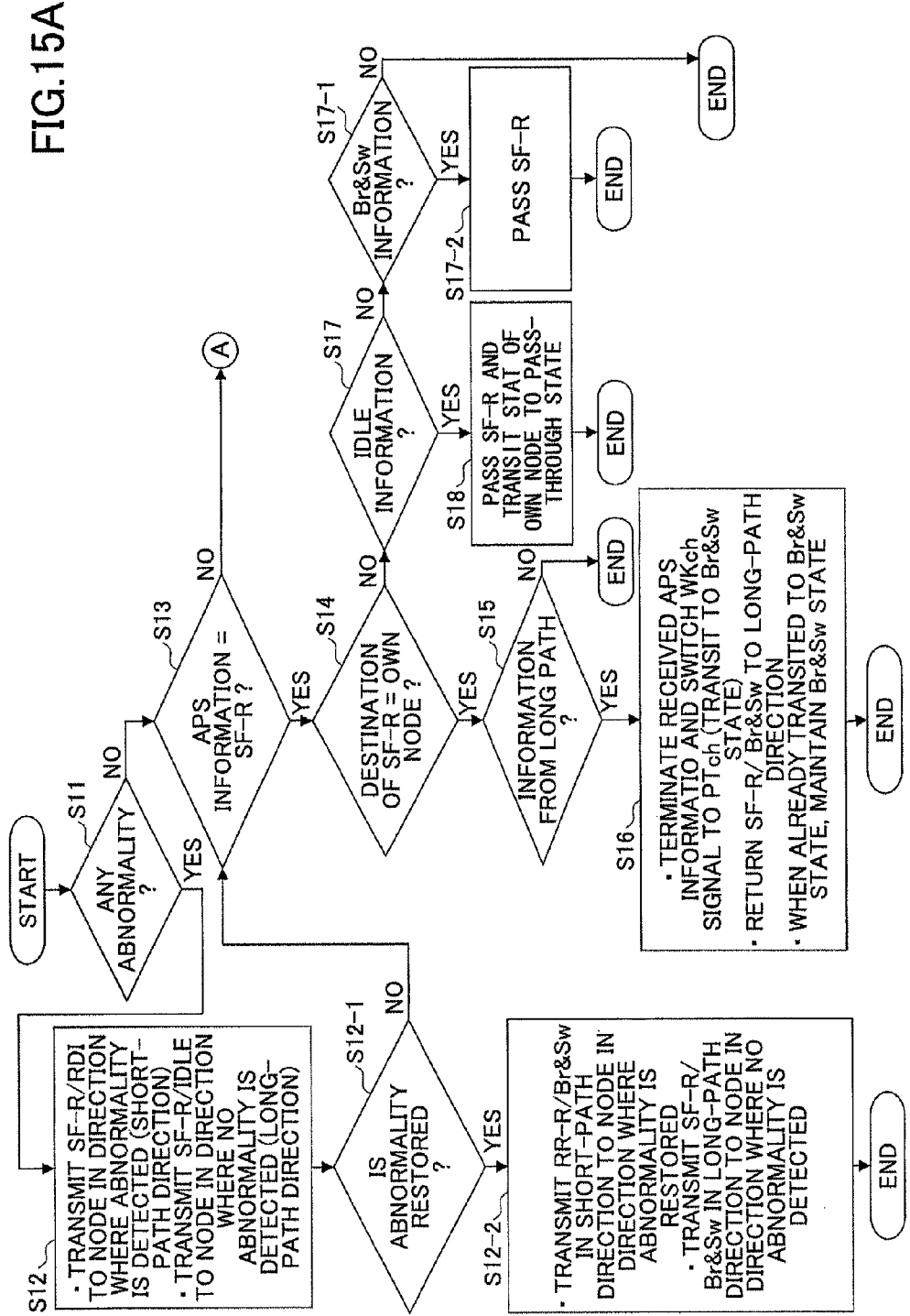

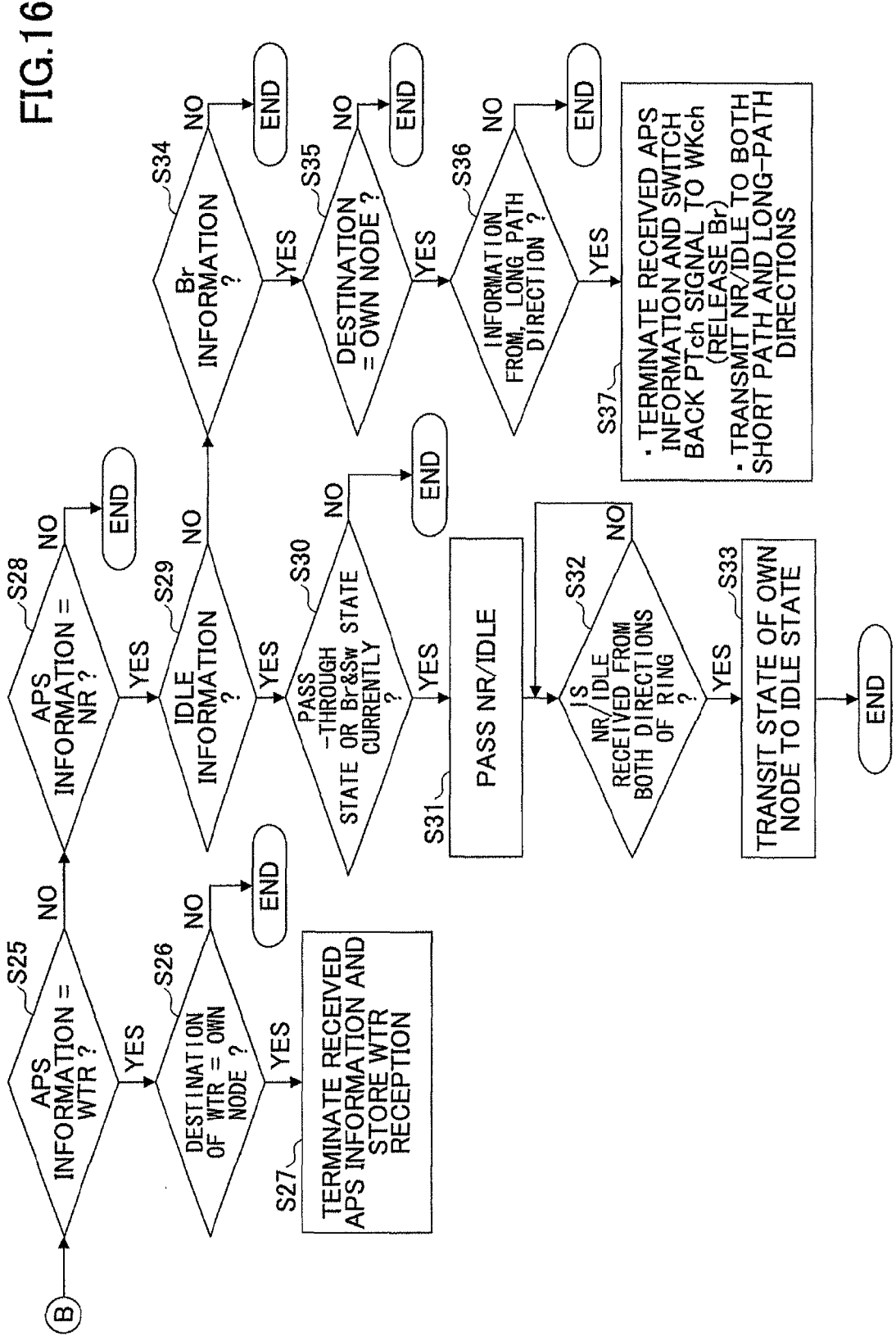

FIG.18

| TIME SLOTS | NORMAL STATE | | | | AFTER RESTORATION OF FAILURE |
|---|---|---|---|---|---|
| | USING CLIENTS | TCM | TCM PRIORITY LEVELS | | USING CLIENTS | TCM |
| WK1~8 | CLIENT A | TCM1 | 2 | | | |
| WK9~16 | CLIENT A | TCM1 | 2 | | | |
| WK17~20 | CLIENT B | TCM2 | 3 | | | |
| WK21~24 | CLIENT C | TCM3 | 4 | | | |
| PT25~32 | CLIENT D | TCM4 | 1 | | CLIENT D | TCM4 |
| PT33~40 | | | | | CLIENT A | TCM1 |
| PT41~44 | | | | | CLIENT B | TCM2 |
| PT45~48 | | | | | CLIENT C | TCM3 |

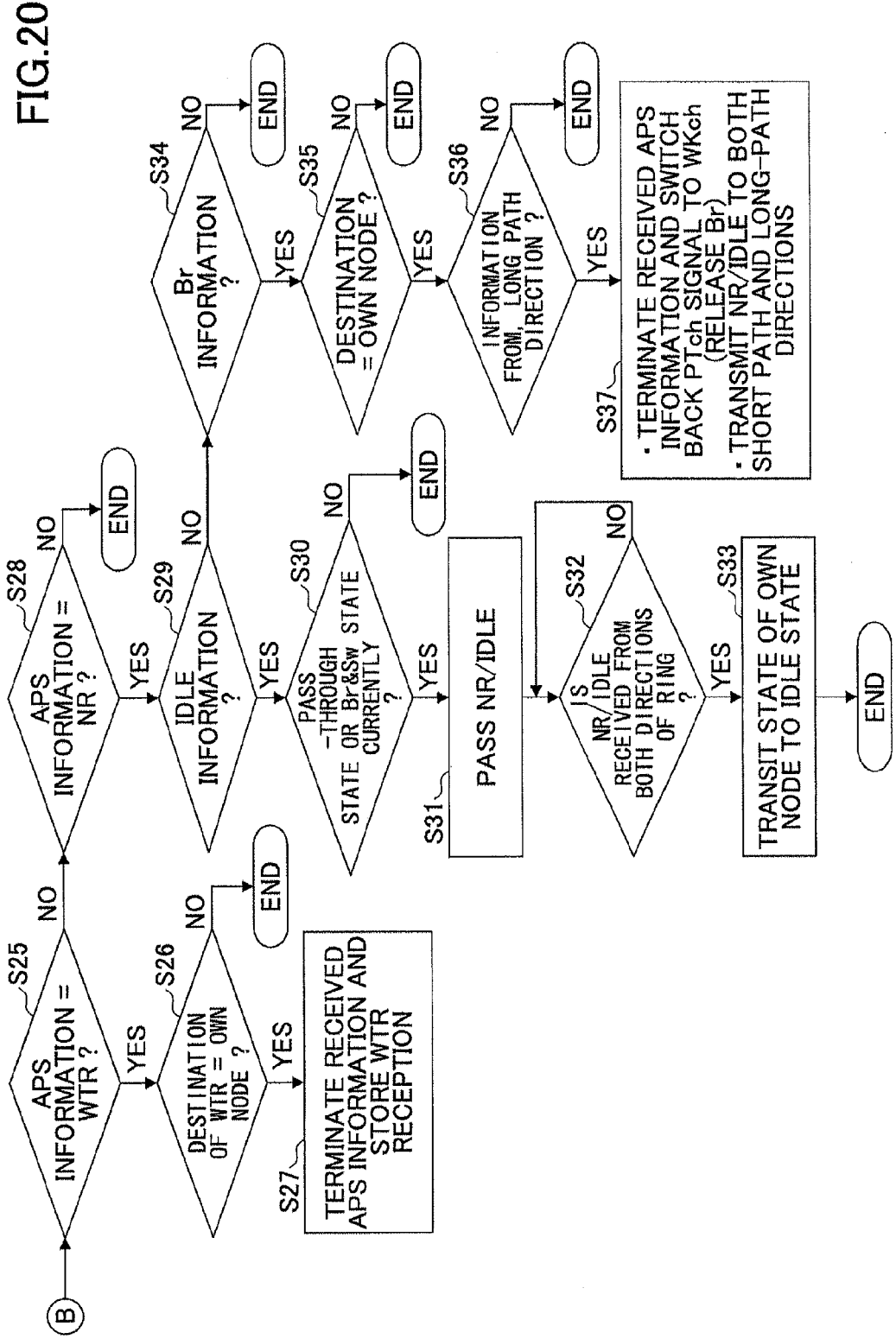

METHOD OF SWITCHING OPTICAL TRANSPORT NETWORK AND NODE DEVICE

CROSS-REFERENCE TO RELATED APPLICATION

This application is a U.S. continuation application of International Application PCT/JP2009/071780 filed on Dec. 28, 2009 and designated the U.S., the entire contents of which are incorporated herein by reference.

FIELD

The embodiment discussed herein is related to a method of switching an optical transport network and a node device in the optical transport network.

BACKGROUND

Recently, an optical transport system in compliance with a SONET (Synchronous Optical Network) or an SDH (Synchronous Digital Hierarchy) has become more and more popular. Further, based on recommendation G.709 of ITU-T and while assuming as a WDM (Wave length Division Multiplexing) transmission which may respond to an explosive increase of internet traffic, an OTN (Optical Transport Network) has been standardized and introduced into commercial systems rapidly as a so-called transparent transportation platform, in which an upper layer may not recognize a lower layer at all in end-to-end communications of a client signal in a synchronous network such as the SDH and SONET and an asynchronous network such as an IP (Internet Protocol) and an Ethernet system.

Further, in a system mutually connecting ring networks and communicating, there has been known a technique employing a ring recovery method using a UPSR (Unidirectional Path Switched Ring) or a BPSR (Bidirectional Path Switched Ring) method to recover from a failure upon occurrence of a failure in a transport path (see Japanese Laid-open Patent Publication No. 2003-46522).

Further, there has been known another method to combine the UPSR and BLSR methods having channel allocation methods different from each other so that a network may be configured and a flexible and expandable optical network may be realized (see Japanese Laid-open Patent Publication No. 10-313332).

SUMMARY

According to an aspect of the present application, there is provided a node device in an optical transport ring network including plural node devices connected in a ring form using plural optical transmission paths so that optical transport frames of a working line and a protection line are transmitted using the plural optical transmission paths.

The node device includes a control information transmitter, when a failure occurs in the optical transmission paths, transmitting the optical transport frame to an opposing node device as a transmission destination node in the optical transmission paths, the optical transport frame including switching control information; and a switcher receiving the optical transport frame including switching control information, the optical transport frame being transmitted to the node device as the transmission destination node, forming a loop back to fold a transmission path between the plural optical transmission paths, and switching the optical transmission path from the work line to the protection line.

The object and advantage of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS (米国)

FIG. 1 is a drawing of a configuration of an OTN frame according to an embodiment;
FIG. 2 is a drawing illustrating example settings of the OTN;
FIG. 3 is a drawing illustrating roles of bits in APS/PCC;
FIG. 4 is a drawing illustrating the definitions of bits 1 through 4 of Byte 1 of APS information;
FIG. 5 is a drawing illustrating the definitions of bits 6 through 8 of Byte 1 of the APS information;
FIG. 6 is a drawing illustrating the definitions of bits 1 and 2-3 of Byte 4 of the APS information;
FIG. 7 is a drawing illustrating a configuration of a node device according to an embodiment;
FIG. 8 is a drawing illustrating a configuration of a bidirectional line switched ring network;
FIG. 9 is a sequence diagram of transmitting and receiving the APS information;
FIG. 10 is another sequence diagram of transmitting and receiving the APS information;
FIG. 11 is another sequence diagram of transmitting and receiving the APS information;
FIG. 12 is a drawing illustrating a configuration of the bidirectional line switched ring network according to another embodiment;
FIG. 13 is a drawing illustrating the switching of the ring network;
FIG. 14 is another drawing illustrating the switching of the ring network;
FIG. 15A is a flowchart of a process executed by a controller;
FIG. 15B is a flowchart of a process executed by the controller;
FIG. 16 is a flowchart of the execution of the controller;
FIG. 17 is a drawing illustrating a second embodiment;
FIG. 18 is a drawing illustrating the second embodiment;
FIG. 19A is a flowchart of a process executed by the controller according to the second embodiment;
FIG. 19B is a flowchart of a process executed by the controller according to the second embodiment;
FIG. 20 is a flowchart of a process executed by the controller according to the second embodiment;
FIG. 21 is a drawing illustrating a ring network according to another embodiment;
FIG. 22 is a flowchart of a process executed by a node D according to one embodiment;
FIG. 23 is a drawing illustrating a configuration of a ring network which is being configured; and
FIG. 24 is a drawing illustrating a configuration of an OTN network.

DESCRIPTION OF EMBODIMENT

In a ring network using an optical fiber as a transportation medium, there is an advantage that upon occurrence of a failure in one of the communication lines, the other of the communication lines is used for data transportation.

Therefore, the ring network may be more reliable than one-to-one or one-to-N mesh-type networks. Further, in the ring network, the network is formed by connecting optical fibers in a unicursal manner for communications between adjacent devices. Therefore, the number of the optical fibers may be reduced and the cost may also be reduced.

However, the switching method in a case of a failure of the OTN (i.e., Automatic Protection Switching: APS) has been developed to apply the wavelength division multiplexing technique limited to a transmission in one-to-one or one-to-N configuration. Further, nothing has been standardized for the ring network.

Therefore, when a ring network is configured using the OTN, there may be no ring recovery method like the BLSR method in the SONET or the SDH.

According to one aspect of the embodiment, a node device is provided that recovers from a failure in an optical transport ring network.

In the following, embodiments of the present application are described with reference to the accompanying drawings.
Configuration of OTN Frame First, a configuration of the OTN frame containing a client signal is described. FIG. 1 illustrates a frame configuration of the OTN frame. The OTN frame includes an overhead unit, an OPUk (Optical channel Payload Unit) payload unit, and an OTUkFEC (Optical channel Transport Unit Forward Error Correction) unit.

The overhead unit has a size of 16 bytes from the first column to the sixteenth column by four rows, and is used for connections and quality management.

The OPUk payload unit has a size of 3804 bytes from the seventeenth column to the 3824th column by four rows, and contains a client signal providing one or more services. The OTUkFEC unit has a size of 256 bytes from the 3825th column to the 4085th column by four rows, is used for the correction of errors occurred during the transmissions.

A combination of the overhead bytes to be used for connections and quality management and the OPUk payload unit may be called an ODUk (Optical channel Data unit) unit. Further, a combination of the overhead bytes to be used for frame synchronization, connections, quality management and the like, an OTUkFEC overhead unit, and the ODUk unit may be called an OTUk unit.

Details of the functions of the overhead bytes are disclosed in the recommendation G.709. Here, a TCM and an APS/PCC are briefly described. Further, as ring topology information, an RES bytes at 4 Row and 9-14 Columns are used.

The TCM (Tandem Connection Monitoring) refers to path monitoring information monitoring failure occurrence states and line quality of each of the segments into which a path of the OTN signal is divided (the maximum number of the segments is, for example, 6). Then, TCM1 through TCM6 are defined as the overhead bytes of the ODUk.

FIG. 2 illustrates setting examples (patterns) of the TCM1 through TCM6. In FIG. 2, the path of the nodes A through I is divided. Namely, the segment of nodes A through I is defined as TCM1; the segments of nodes A through C, D through F, and G through I are defined as TCM2; the segment of nodes A through E is defined as TCM3; the segment of nodes F through I is defined as TCM4; the segment of nodes B through H is defined as TCM5; and the segment of nodes D through F is defined as TCM6.

By setting the segments in this way, it may become possible to assign a unique segment for each of network providers and users. Further, it may become possible to monitor the failure occurrence states and the line quality for the OTN signal switching. Further, it may become possible to use for monitoring for another network automatic restoration.

Three bytes are allocated to each of the TCM1 through TCM6, and the following sub-fields TTI, BIP-8, BDI, BEI/BIAE, and STAT are used for supporting the monitoring.
(1) The TTI (Trial Trace Identifier) refers to a trace information monitoring function for a signal between end points.
(2) The BIP-8 (Bit Interleaved Parity 8) refers to an error monitoring function using parity check bits.
(3) The BDI (Backward Defect Indication) refers to a function to report a defect.
(4) The BEI/BIAE (Backward Error Indication and Backward Incoming Alignment Error) refers to a reporting function of error information and frame error information of an input signal.
(5) The STAT (Status bits indicating the presence of TCM overhead, incoming alignment error, or a maintenance signal) refers to a status information function.

The APS/PCC (Automatic protection Switching/Protection Communication Channel) bytes refer to four-byte switching control information. In the following, the APS/PCC may be called APS information.

FIG. 3 illustrates a role of each byte of the APS/PCC. The bit1-4 of Byte1 denotes a request for protection. The bit5 of Byte1 denotes a path of a long path or a short path. Here, the direction in which the number of the nodes through which a signal passes from the transmission source node to the transmission destination node is fewer (a WEST direction or an EAST direction) herein refers to a short-path direction.

The direction in which the number of the nodes is greater herein refers to a long-path direction. The bit6-8 of Byte1 denotes a status. The Byte2 denotes the node ID of the request destination. The Byte3 denotes the node ID of the resource source. The bit1-3 of Byte 4 denotes the state of the request source node.

FIG. 4 illustrates the definitions of bit1-4 of Byte1 of the APS information. For example, the data "1111" indicate the prevention of switching from a work line to a protection line (LP-S: Lockout of Protection-Span). Further, the data "1110" and "1101" indicate the compulsory switching from the work line to the protection line (FS-S/FS-R: Forced Switching-Span/Forced Switch-Ring).

Further, the data "1100" and "1011" indicate automatic switching due to transmission path defect (SF-S/SF-R: Signal Fail-Span/Signal Fail-Ring). Further, the data "1010", "1001", and "1000" indicate automatic switching due to transmission quality degradation (SD-P/SD-S/SD-R: Signal Degrade-Protection/Signal Degrade-Span/Signal Degrade-Ring).

Further, the data "0111" and "0110" denote manual switching (MSS-MS-R: Manual Switch Span/Manual Switch Ring), and the data "0101" denotes restoration wait (WTR: Wait to Restore). Further, the data "0010" and "0001" denote switching response (RR-S/RR-R: Reverse Request-Span/Reverse Request-Ring), and the data "0000" denotes no switching (NR: No Request).

FIG. 5 illustrates the definitions of bit6-8 of Byte1 of the APS information. For example, the data "111" denotes a state to report a failure to upstream (Line AIS (Alarm Indication Signal)) and the data "110" denotes a state to report a failure to downstream (Line RDI (Remote Defect Indicator)).

Further, the data "011" denotes a state where a cross-connection is set to the protection line under the idling state (ET (Extra Traffic) on Protection Channel), and the data "010" denotes a ring switching and span switching state (Br&Sw: Bridged and Switched).

Further, the data "001" denotes a state where the same signal is transmitted in the work line and the protection line in a process of the ring switching and span switching (Br: Bridged), and the data "000" denotes a state where the ring switching and the span switching are not performed (Idle).

FIG. 6 illustrates the definitions of the states of the request source node by bit1 and bit2-3 of Byte4 of the APS information. The data "1" of bit1 denotes a BLSR operating mode (Enhanced BLSR) in this embodiment, and the data "0" denotes a BLSR non-operating mode (Traditional BLSR) in this embodiment.

The data "11" of bit2-3 indicates that there is a cross-connection in the work line and the protection line (Work & Protection), the data "10" of bit2-3 indicates that there is the cross-connection in the work line only (Work), the data "01" of bit2-3 indicates that there is the cross-connection in the protection line only (Protection), and the data "00" of bit2-3 indicates that there is no cross-connection in both of the work line and the protection line (None).

Further, the cross-connection information of the work line and the protection line of the optical transmission path on the EAST (or WEST) side is included in the bit1, 2-3 of Byte4 of the APS information of the OTN Frame to be transmitted to the WEST (or EAST) side.

Configuration of Node Device

FIG. 7 illustrates a configuration of the node device according to an embodiment. In FIG. 7, an optical fiber 21 on the EAST side is connected to an optical receiver 22. The optical receiver 22 converts the optical signals of the work line w and the protection line p on the EAST side into the respective electronic signals (ODU frames), supplies the work line w to a ring switch 26 (R-SW) of a BLSR switcher 25, and also supplies the protection line p to a ring switch 27, a selection switch (S,S) 29, and a cross-connection unit (ODU_XC) 36.

Further, the optical receiver 22 reports a failure detection result (alarm information) to a controller 35 by detecting a failure such as a line cut and degradation of line quality.

Further, optical fiber 23 on the WEST side is connected to an optical receiver 24. The optical receiver 24 converts the optical signals of the work line w and the protection line p on the WEST side into the respective electronic signals, supplies the work line w to a ring switch 27 of the BLSR switcher 25, and also supplies the protection line p to a ring switch 26, a selection switch 31, and the cross-connection unit 36.

Further, the optical receiver 24 reports the failure detection result (alarm information) to the controller 35 by detecting a failure such as the line cut and the degradation of line quality.

The ring switch 26 takes (selects) one of the work line w on the EAST side and the protection line p on the WEST side under the control of the controller 35 and supplies the selected line to the a selection switch 28 and the cross-connection unit 36.

The ring switch 27 takes (selects) one of the work line w on the WEST side and the protection line p on the EAST side under the control of the controller 35 and supplies the selected line to the a selection switch 30 and the cross-connection unit 36.

The cross-connection unit 36 performs the cross-connection on the signal (ODU frame) supplied from the BLSR switcher 25, and supplies the cross-connected signal to a cross-connection unit 37 or an ODU demapper 41 of a client interface unit 40.

The ODU demapper 41 demaps the ODU frame, and supplies the demapped ODU frame to a client signal mapper/demapper 42. The client signal mapper/demapper 42 maps the signal supplied from the ODU demapper 41 to the client signal such as SONNET or IP frames, and externally outputs the mapped signal.

Further, the client signal mapper/demapper 42 demaps an externally-supplied client signal such as SONNET or IP frames, and supplies the demapped client signal to an ODU mapper 43. The ODU mapper 43 maps the signal supplied from the client signal mapper/demapper 42 to the ODU frame, and supplies the mapped signal to the cross-connection unit 37.

Further, the client signal includes an SDH/SONET signal such as STM-16/OC-48, STM-64/OC-192, STM-256/OC-768 and the like, an OTN signal such as OTU1, OTU2, OTU3, OTU4 and the like, an Ethernet (registered trademark) signal such as GbE, 10 GbE, 40 GbE, 100 GbE and the like, a fibre channel signal such as FC, 2GFC, 4GFC and the like, various stream signals such as an ATM signal, an FICON/ESCON signal and the like, and a packet signal.

The cross-connection unit 37 performs cross connection on the signal supplied from the cross-connection unit 36 or the ODU mapper 43, and supplies the cross-connected signal to the selection switches 28, 29, 30, and 31.

The selection switch 28 takes a signal (ODU frame) supplied from the ring switch 26 or the ODU mapper 43 under the control of the controller 35, and supplies the signal to a loop back switch (R-BP) 33 and an optical transmitter 45 as the work line w on the WEST side.

The selection switch 29 takes a signal (ODU frame) supplied from the protection line p on the EAST side or the cross-connection unit 37 under the control of the controller 35, and supplies the signal to a loop back switch 32.

The selection switch 30 takes a signal (ODU frame) supplied from the ring switch 27 or the cross-connection unit 37 under the control of the controller 35, and supplies the signal to the loop back switch 32 and an optical transmitter 47 as the work line w on the EAST side.

The selection switch 31 takes a signal (ODU frame) supplied from the protection line p on the WEST side or the cross-connection unit 37 under the control of the controller 35, and supplies the signal to the loop back switch 33.

The loop back switch 32 takes a signal (ODU frame) supplied from the selection switch 29 or the selection switch 30 under the control of the controller 35, and supplies the signal to the optical transmitter 45 as the work line w on the WEST side. The loop back switch 33 takes a signal (ODU frame) supplied from the selection switch 28 or the selection switch 31 under the control of the controller 35, and supplies the signal to the optical transmitter 47 as the protection line p on the EAST side.

The optical transmitter 45 converts the electronic signals of the work line w and the protection line p on the WEST side into the respective optical signals and supplies the optical signals to an optical fiber 46 on the WEST side.

The optical transmitter 47 converts the electronic signals of the work line w and the protection line p on the EAST side into the respective optical signals and supplies the optical signals to an optical fiber 48 on the EAST side.

First Embodiment

As illustrated in FIG. 8, a bidirectional switching ring network (BLRS: Bidirectional Line Switched Ring) including nodes A through G is formed. The nodes A through G have the configuration as illustrated in FIG. 7. The transmissions of the APS information (APS/PCC) between the nodes in a case where a failure occurs between the nodes E and F of this ring network are described with reference to FIGS. 9 through 11.

Figure 9:
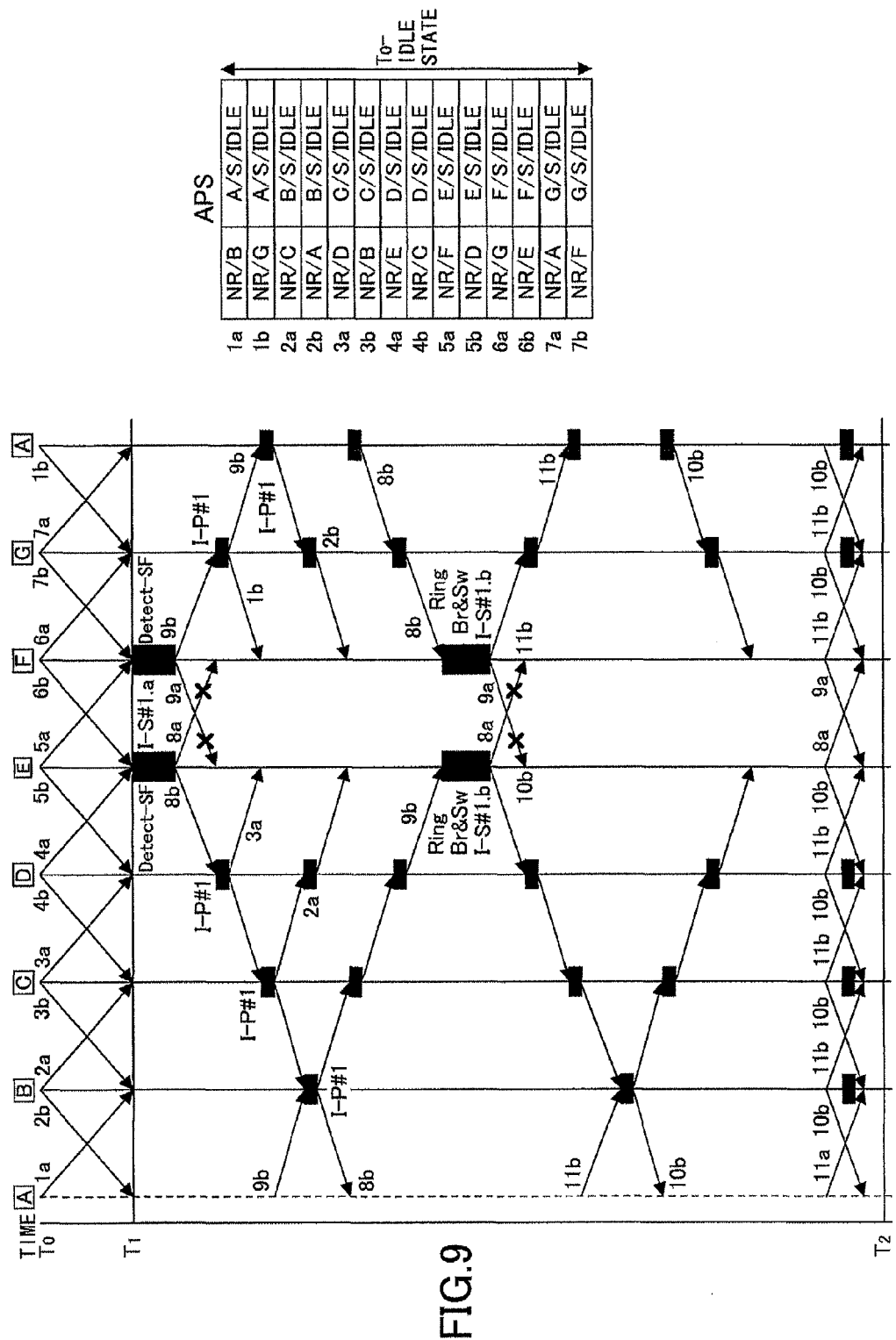
FIG. 9 illustrates an APS information transmission and receiving sequence from an IDLE state to a SWITCHING state.

In FIG. 9, the "NR/G" through "NR/A" in the first half of the frames 1a, 1b through 7a, and 7b transmitted from the nodes A through G in the idle state at the first time T0 indicate no request (NR) to which the addresses of the next corresponding nodes G through A are added. The "A/S/IDLE" through "G/S/IDLE" indicate that the corresponding nodes are in the idle state. Here, the "S" refers to a short path, and the "L" refers to a long path.

Therefore, when the bidirectional ring network is in normal condition, in the idle state at time T0, the APS information with address of the next node is transmitted from each node. For example, from node E to node F, a frame 5a (NR/F, E/S/IDLE) to which the address of node F is added is transmitted. In the node F, the received frame 5a includes the address of the node F, the received APS information is terminated.

Further, from node F to node G, a frame 6a (NR/G, F/S/IDLE) is transmitted. In the same manner, frames 1b through 7b are transmitted in the left direction and the frames 1a through 7a are transmitted in the right direction.

At time T1, a failure occurs between node E and node F, and both of the nodes E and F detect the failure. Then, the node E transmits the frames 8a and 8b to which the address of the node F is added, and the node F transmits the frames 9a and 9b to which the address of the node E is added.

In the case, if the failure is a line cut, the frames 8a and 9a are not received by the opposing nodes. However, if the failure corresponds to the increase of the error rate due to the degradation of the line quality, the opposing nodes may receive the frames.

Those frames 8a, 8b, 9a, and 9b are "SF-R/F, E/S/RDI", "SF-R/F, E/L/IDLE", "SF-R/E, F/S/RDI", and "SF-R/E, F/L/IDLE", respectively. The "SF" in this case denotes an SF (Signal Failure) signal indicating the signal cut and the like.

The "RDI" denotes a distal end receiving failure signal. The frame 8b transmitted from node E to node D is a frame to which the address of node F is added. Therefore, the node D receives the APS information including the address other than the address of the node D. Therefore, the node D allows the frame 8b to pass through the node D.

In the same manner, other nodes C, B, A, and G also allow the frame 8b to pass through the respective nodes. Therefore, the node F may receive the frame 8b through the log path from the node E. Further, the frame 9b transmitted from the node F to the node G is a frame to which the address of the node E is added.

Therefore, the APS information may pass through the nodes G, A, B, C, and D, so that the node E may receive the frame 9a via a long path. In this case, with respect to the frames 8b and 9b from the nodes E and F, the other nodes A, B, C, and D are set as a path-through condition.

Upon receiving the frame 9b from node F, the node E forms a folding circuit, and transmits a frame 10b to the node D. On the other hand, upon receiving the frame 8b from node E, the node F forms a folding circuit, and transmits a frame 11b to the node G. The frames 10b and 11b are "SF-R/F, E/L/Br&Sw" and "SF-R/E, F/L/Br&Sw", respectively.

Here, the "Br&Sw" denotes a switching state with a formed folding circuit (ring switch and span switch). Therefore, the communications between the end stations connecting the nodes G and D may be continued by using a path bypassing the failure portion. Further, the frame 10b from the node E sequentially passes through the nodes D, C, B, and A and is transmitted to the node F.

On the other hand, the frame 11b from the node F sequentially passes through the nodes G, A, B, C, and D, and is transmitted to the node E.

Figure 10:
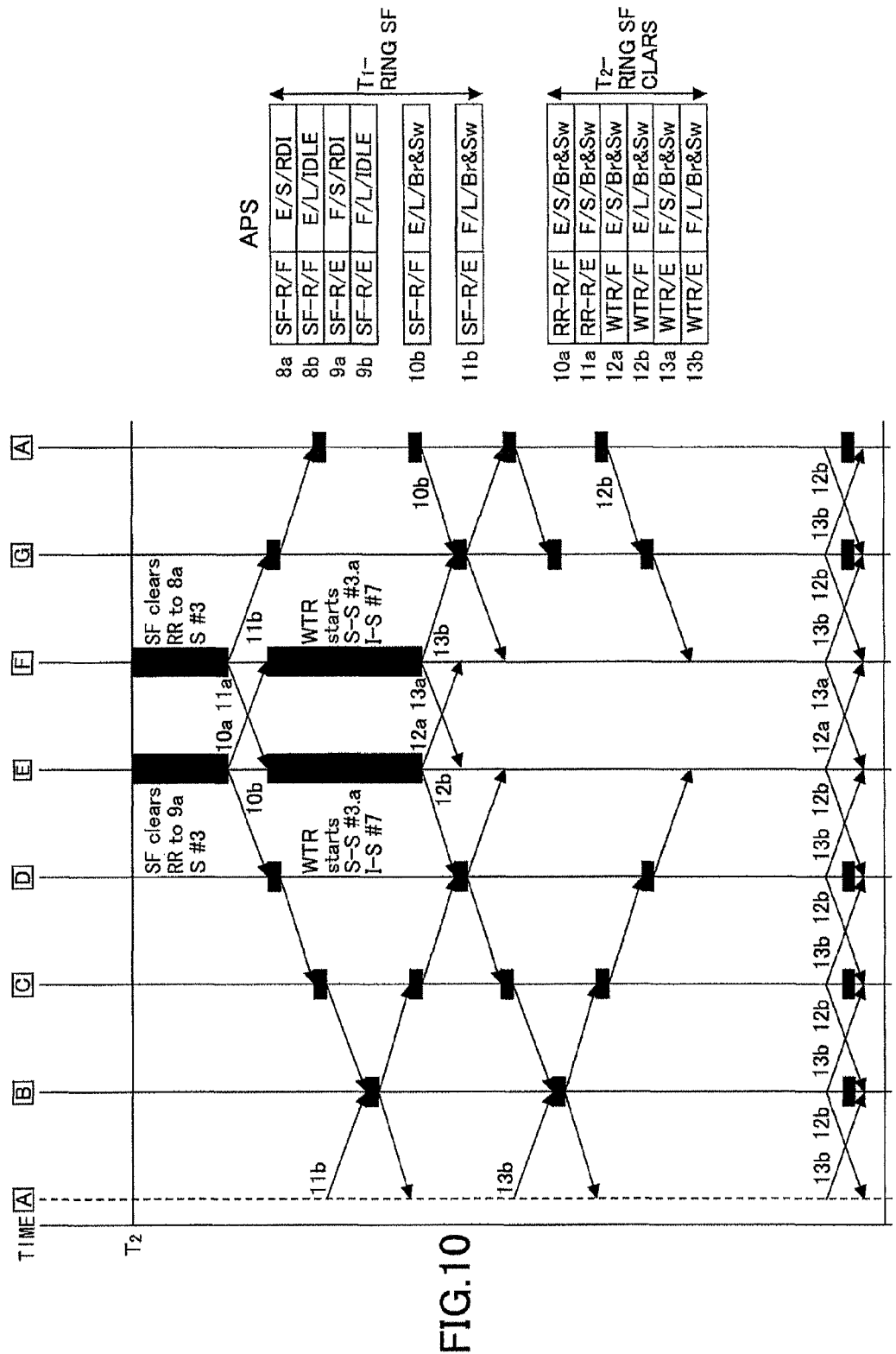
FIG. 10 illustrates the APS information transmission and receiving sequence right after a failure is restored.

At time T2 illustrated in FIG. 10, when the failure between the nodes E and F is restored, the above described frame 10b is transmitted from the node E to the node D, and a frame to which the address of the node F is added is transmitted from the node E to the node F.

Further, the above described frame 11b is transmitted from the node F to the node G, and a frame to which the address of the node E is added is transmitted to from the node F to the node E. The frames 10a and 11a are "RR-R/F, E/S/Br&Sw" and "RR-R/E, F/S/Br&Sw", respectively.

Here, the "RR" denotes a switch response (reverse request), and the frames 10b and 11b pass through other nodes in the same manner as before, and the transmissions of the frames 10b and 11b may be continued until the failure is restored.

After the restoration of the failure, upon receiving the frame 11a from the node F, the node E starts a timer setting a restoration protection time WTR. On the other hand, upon receiving the frame 10a from the node E, the node F starts a timer setting the restoration protection time WTR.

The timer in this case may be any of a software timer, a hardware timer counting a clock signal and the like, or may use another timer for monitoring. Then, the nodes E and F transmit frames 12a, 12b, 13a, and 13b. The frames 12a, 12b, 13a, and 13b are "WTR/F, E/S/Br&Sw", "WTR/F, E/L/Br&Sw", "WTR/E, F/S/Br&Sw", and "WTR/E, F/L/Br&Sw", respectively.

Then, until the restoration protection time WTR has passed, the frame 12b is repeatedly transmitted from the node E to the node F via the nodes D, C, B, A, and G in a passing-through state. Also, the frame 13b is repeatedly transmitted from the node F to the node E via the nodes G, A, B, C, and D in the passing-through state. Further, the frames 12a and 13a are transmitted and received between the nodes E and F.

Figure 11:
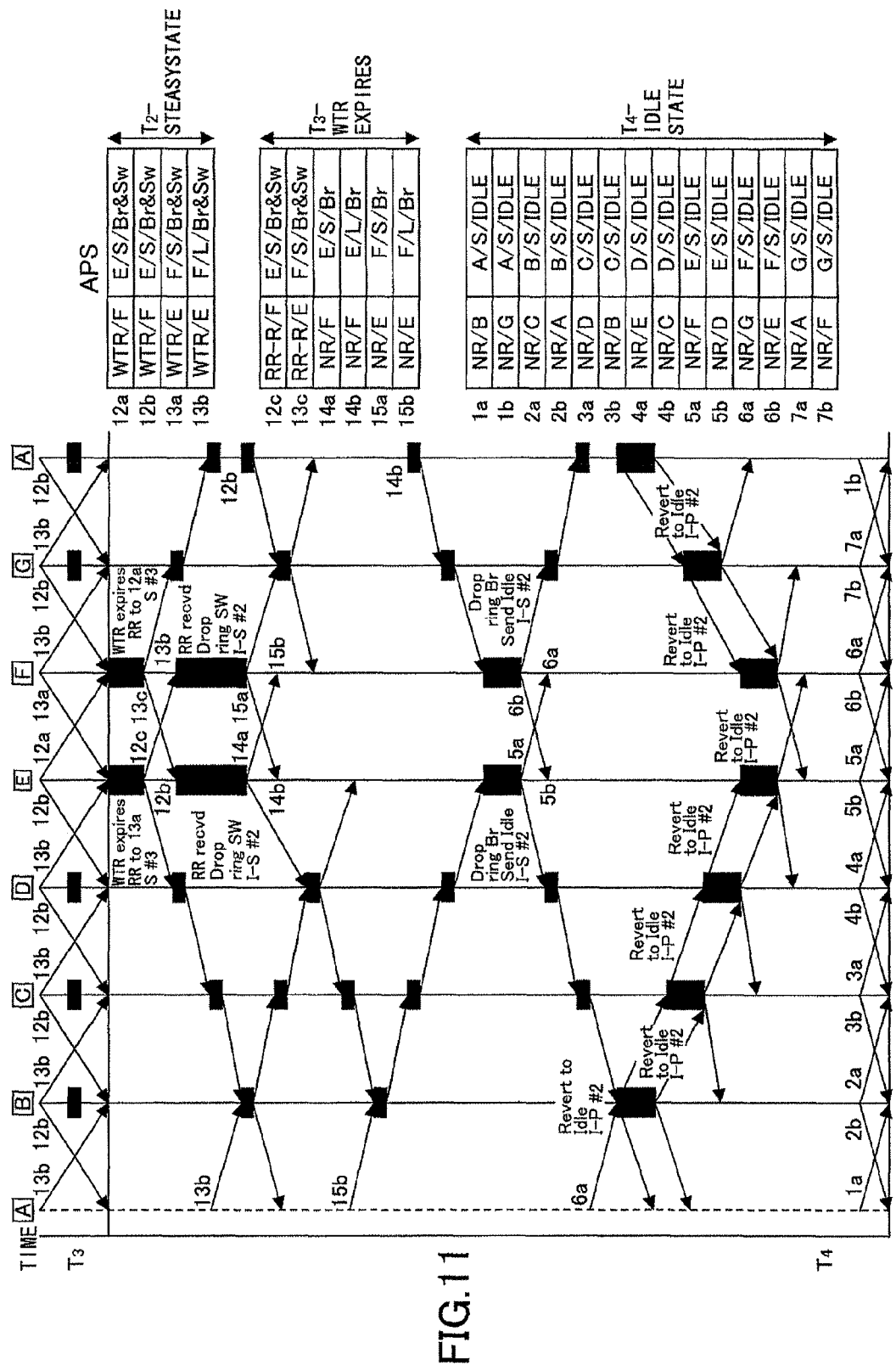
FIG. 11 illustrates the APS information transmission and receiving sequence upon a switching back after the failure is restored. Further, time T0 refers to a normal time; time T1 refers to a failure occurrence time; time T3 refers to a switching back start time; and time T4 refers to a switching back end time.

At time T3 of FIG. 11, when the timer is at the setting time, namely when the restoration protection time WTR has passed, the node E transmits a frame 12c to which the address of the node F is added and the node F transmits a frame 13c to which the address of the node E is added. The frames 12c and 13c are "RR-R/F, E/S/Br&Sw" and "RR-R/E, F/S/Br&Sw" and are similar to the frames 10a and 11a, respectively.

Upon receiving the frame 13c, the node E restores the folding circuit, transmits a frame 14b to which the address of the frame F is added to the node D, and transmits a frame 14a to the node F. Upon receiving the frame 12c, the node F restores the folding circuit, transmits a frame 15b to which the address of the frame E is added to the node G, and transmits a frame 15a to the node E.

The frames 14a, 14b, 15a, and 15b are "NR/F, E/S/Br", "NR/F, E/L/Br", "NR/E, F/S/Br", and "NR/E, F/L/Br", respectively. Upon receiving the frame 15b, the state of the node E is transited to the idle state. Further, upon receiving the frame 14b, the state of the node F is also transited to the idle state.

The state of the other nodes A, B, C, D, and G is also sequentially changed from the pass-through state to the idle state. At time T4 in the same state of the idle state in time T0, the frames 1a, 1b through 7a, 7b are transmitted from the nodes A through G. Namely, the APS information is terminated at each of the nodes A through G, and newly generated APS information is transmitted to the next nodes.

Figure 12:
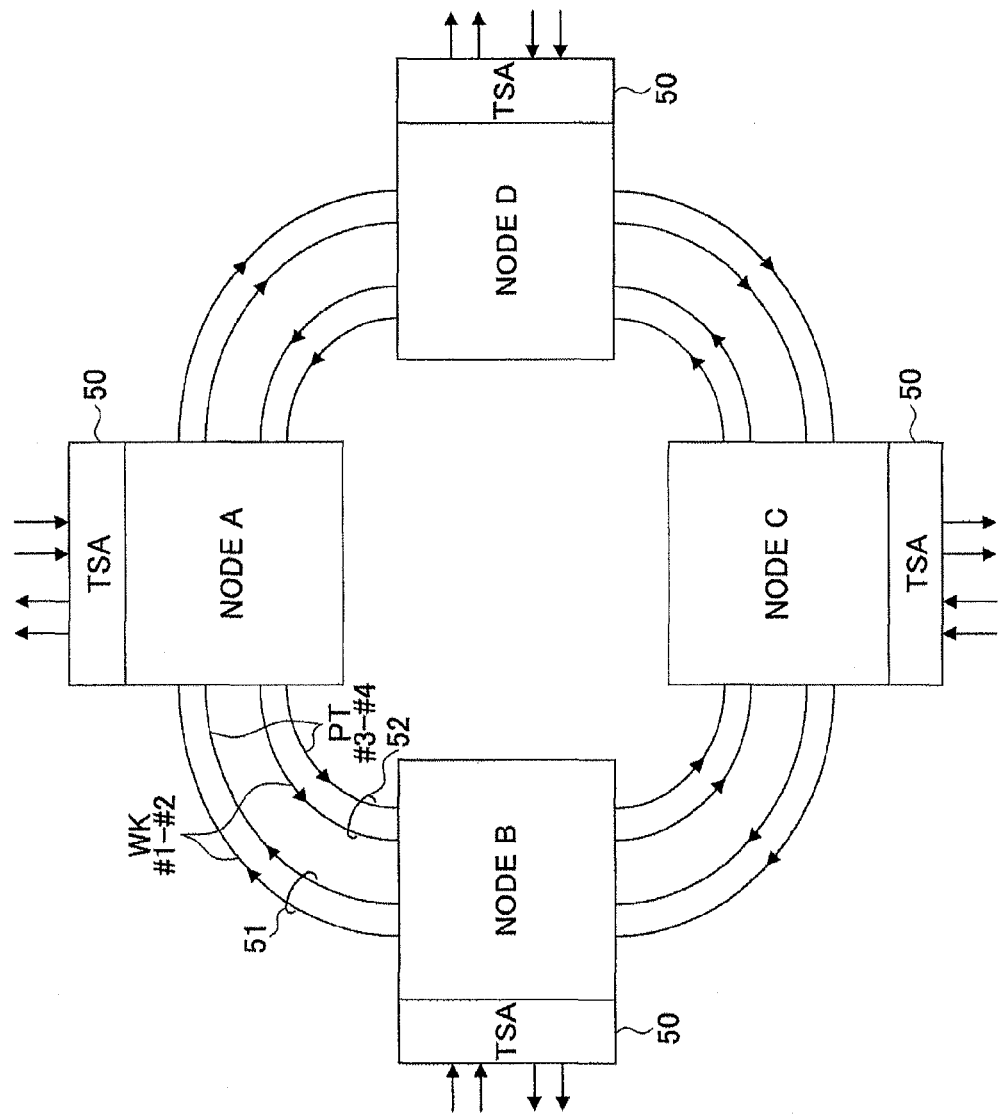

FIG. 12 illustrates a configuration of the bidirectional switching ring network in another embodiment. In FIG. 12, the nodes A, B, C, and D constitute a ring network, and two optical fibers are used to connect between nodes.

Here, in an OTU-2 ring network where the ODU-1 is multiplexed using four lines to form ODU-2, in a first optical fiber 51, the time slots Nos. #1-#2 are occupied at the transmission rate of two lines of the ODU-1 (5 Gbps) as the work line and the slots Nos. #3-#4 are occupied at the transmission rate of two lines of the ODU-1 (5 Gbps) as the protection line. Similarly, in a second optical fiber 52, the time slots Nos. #1-#2 are occupied at the transmission rate of two lines of the ODU-1 (5 Gbps) as the work line and the slots Nos. #3-#4 are occupied at the transmission rate of two lines of the ODU-1 (5 Gbps) as the protection line.

Figure 1:
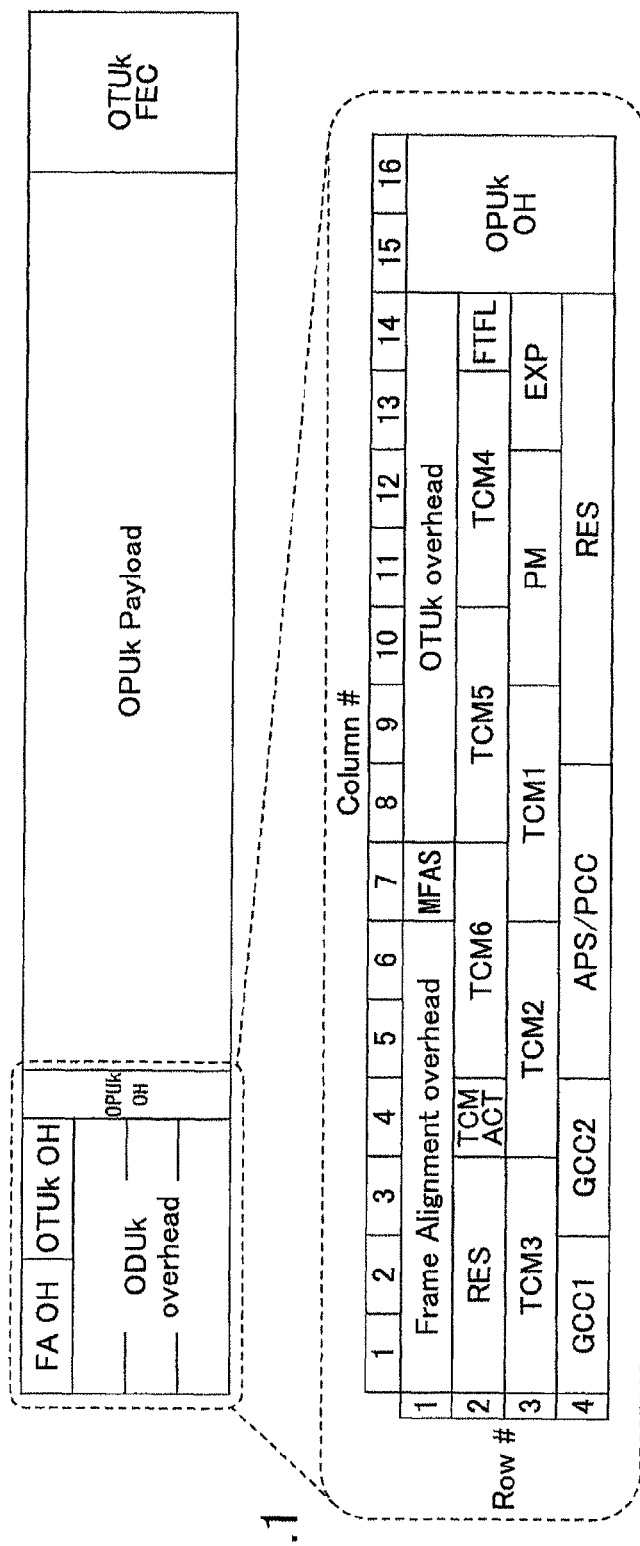
Figure 2:
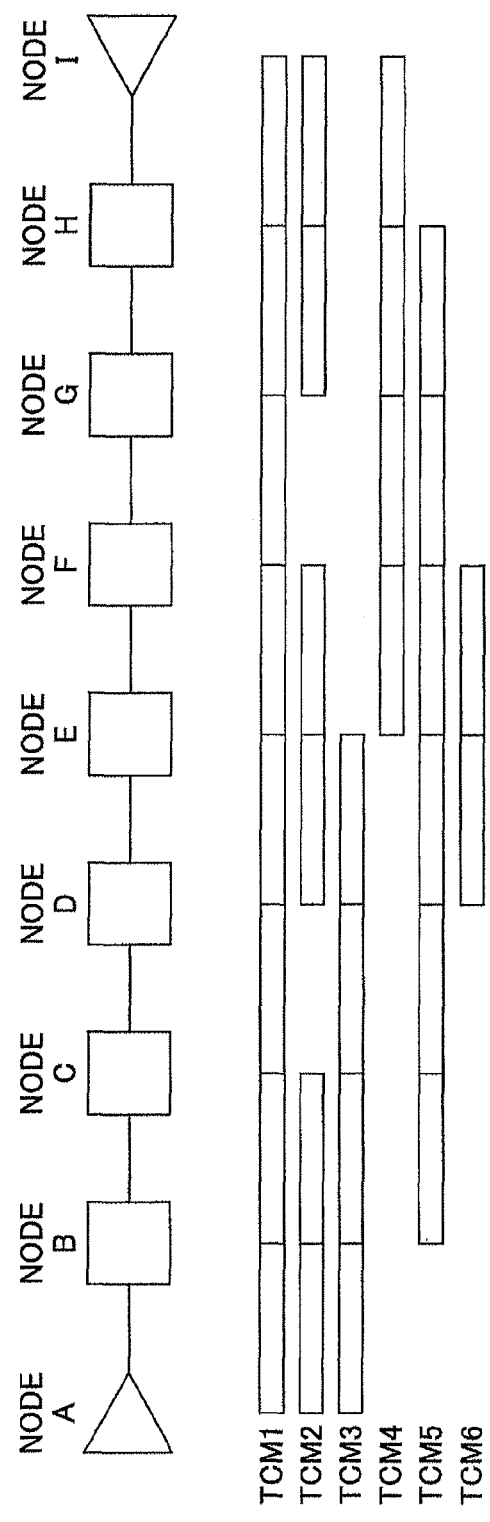
Figure 7:
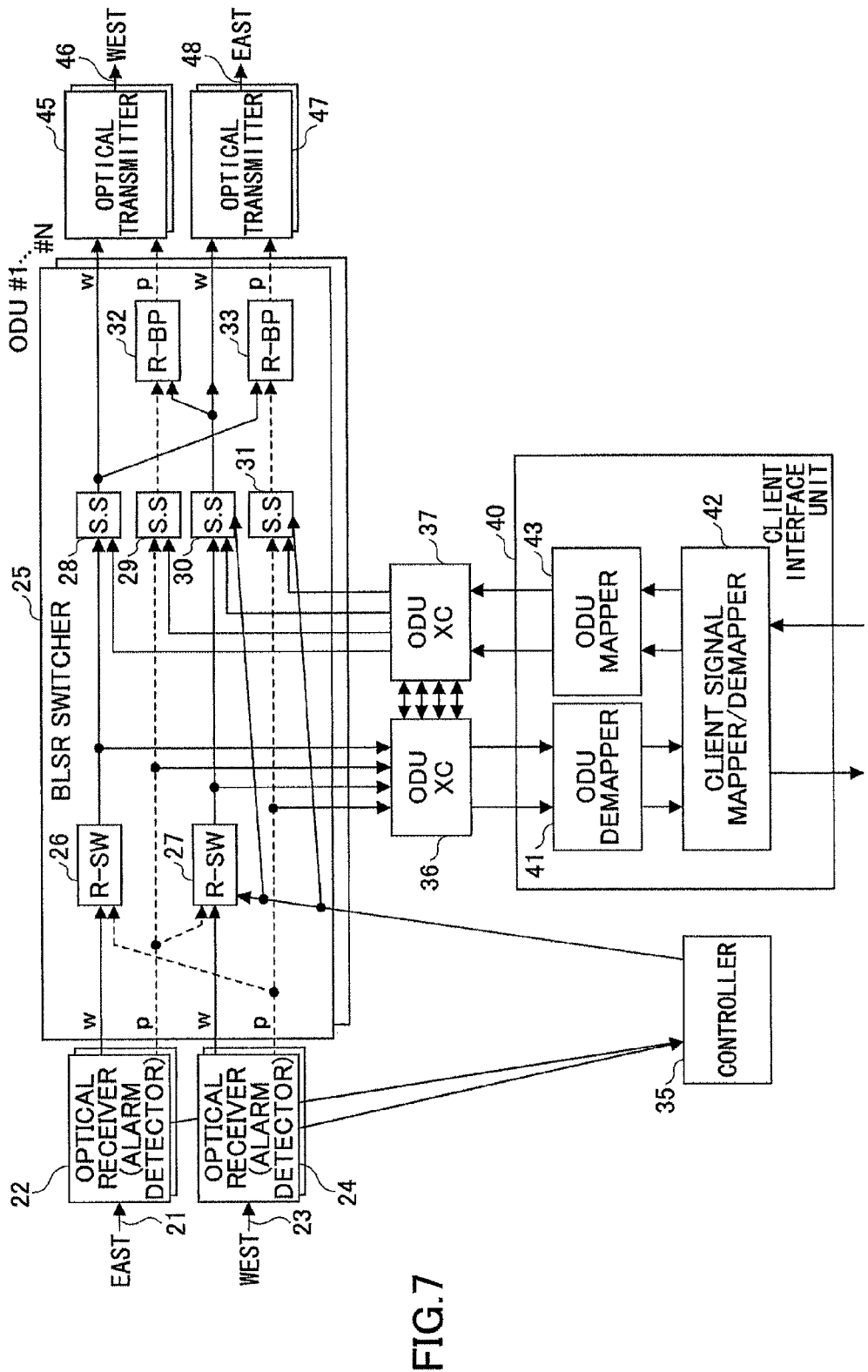
Figure 8:
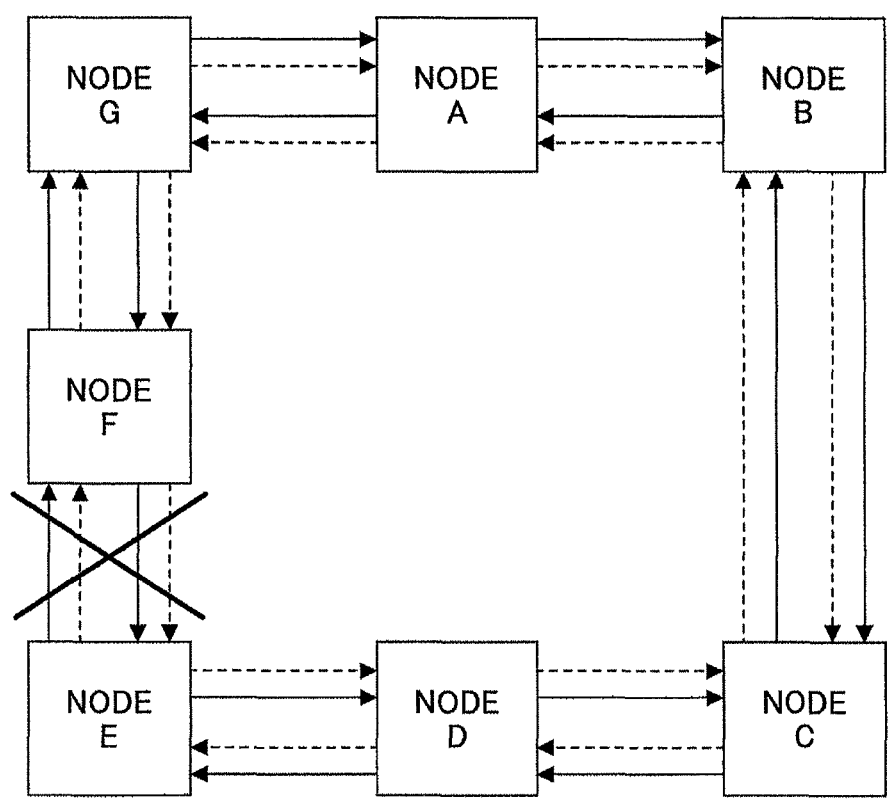

Further, each of the nodes A, B, C, and D relays (Through), inserts (Add), and extracts (Drop) transmission data. Among those, a TSA (Time Slot Assignment) 50 performs the insertion (Add) and Extraction (Drop). The TSA 50 corresponds to the client interface unit 40 of FIG. 7.

Figure 13:
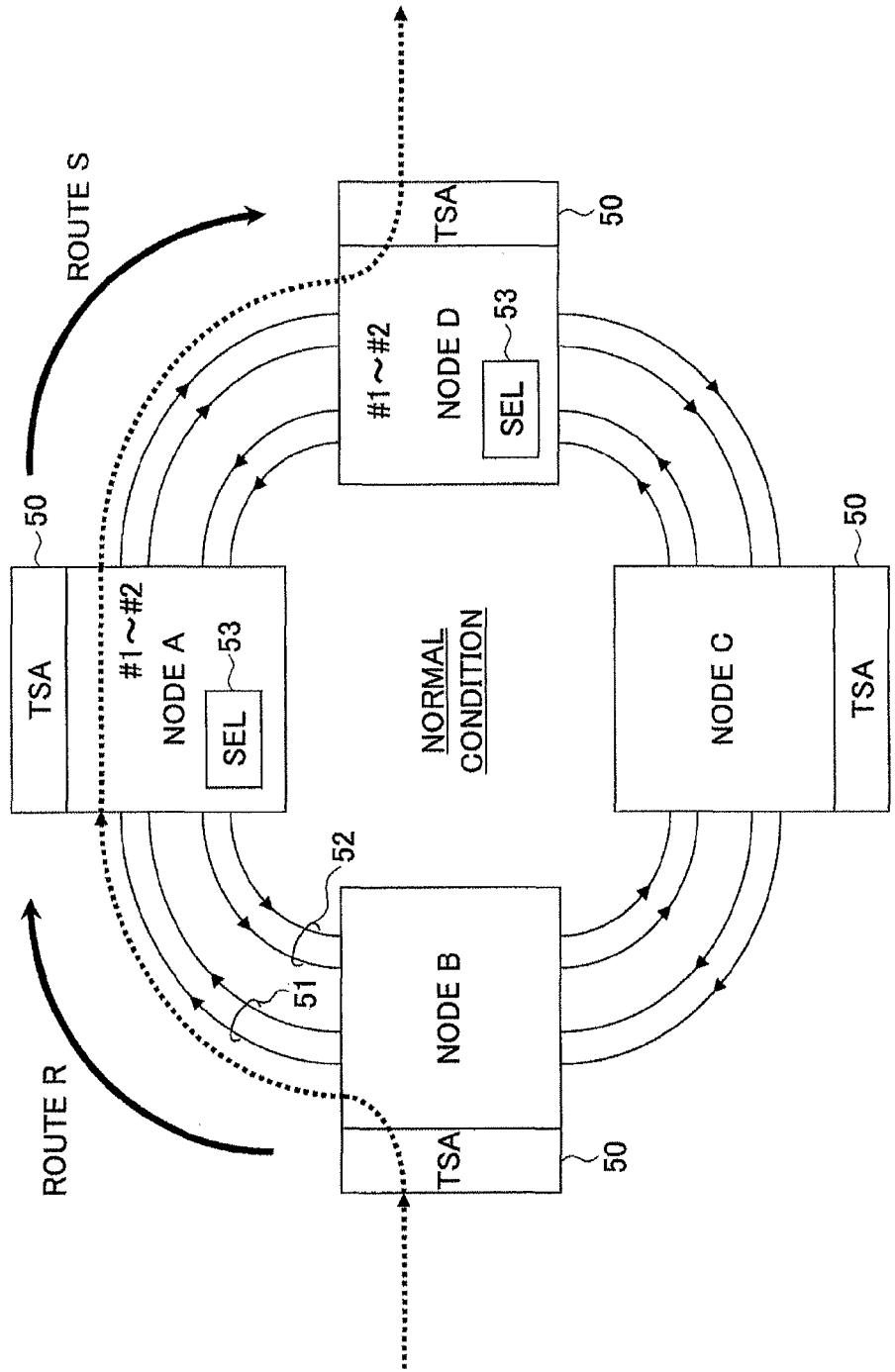
Figure 14:
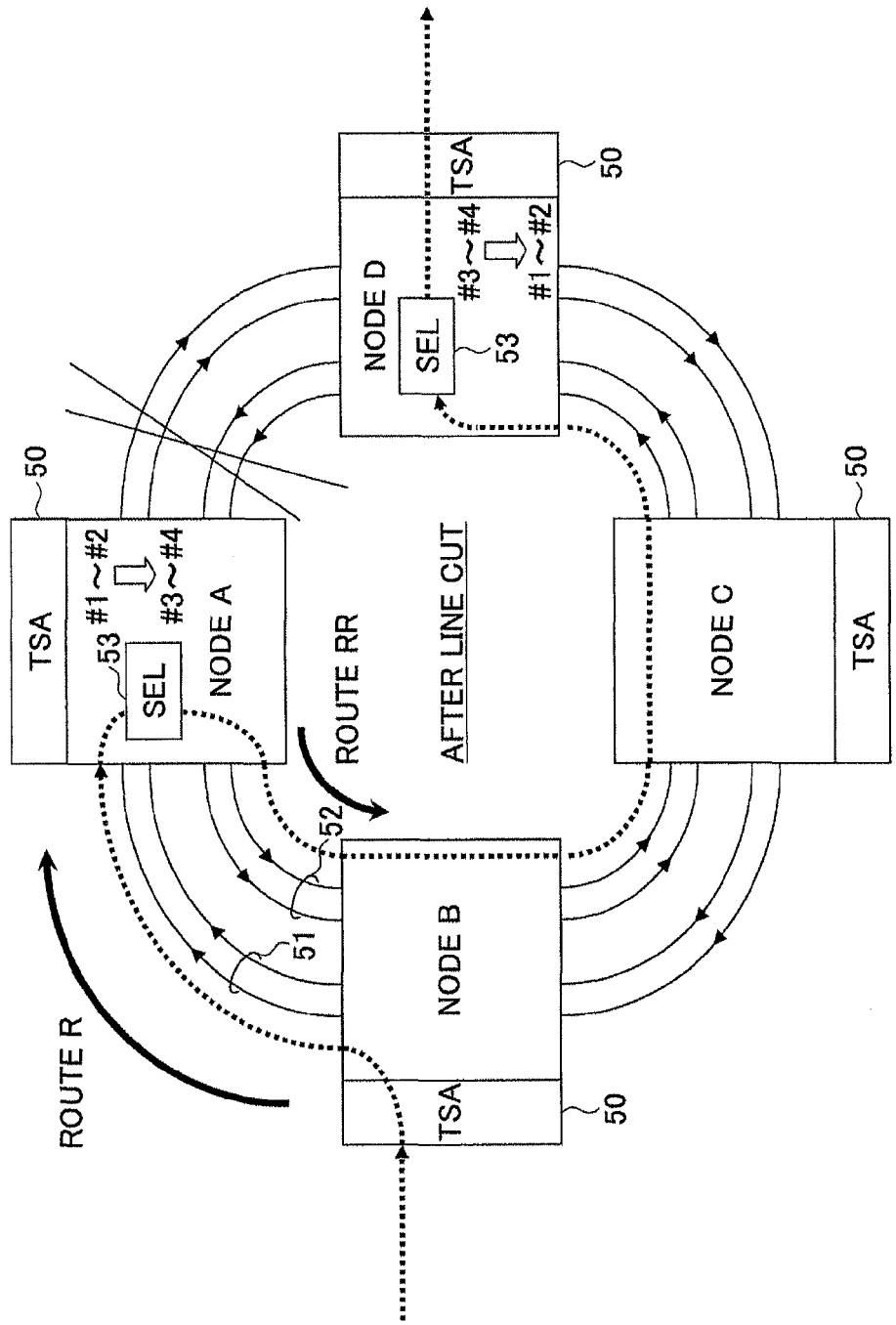

As illustrated in FIG. 13, the transmission data inserted into the node B is transmitted from the node B to the node A via the route R and further transmitted from the node A to the node D via the route S, and extracted from node D. In this state, a case is described when the line at the point of X between the nodes A and the node D is cut.

When the line between the node A and node D is cut, the optical receiver issues an alarm to alert the failure. This alarm is detected by an alarm monitor of the node A, and a request for loopback switching is sent to the node D which is the opposing station by using the APS/PCC.

Further, the loopback switching is performed in the node A by a selector 53. The selector 53 corresponds to the BLSR switcher 25 in FIG. 7, and performs the interchange of the time slots, that is TSI (Time Slot Interchange).

By interchanging the transmission data from the time slot Nos #1-#2 of the work line to the time slot Nos #3-#4 of the protection line by using the selector 53 in the node A, the transmission route R is folded to the transmission route RR. Here, the transmission data are transmitted from the node B to the node D via the nodes A, B, and C. Further, by interchanging the transmission data again by the selector 53 in the node D, namely by interchanging the transmission data from the time slot Nos #3-#4 of the protection line to the time slot Nos #1-#2 of the work line, the transmission data are supplied to the TSA 50 and extracted by the TSA 50 of the node D.

Further, in an OTU-3 ring network where the ODU-2 is multiplexed using four lines to form ODU-3, in the first optical fiber 51, the time slots Nos. #1-#2 are occupied at the transmission rate of two lines of the ODU-2 (20 Gbps) as the work line and the slots Nos. #3-#4 are occupied at the transmission rate of two lines of the ODU-2 (20 Gbps) as the protection line. Similarly, in the second optical fiber 52, the time slots Nos. #1-#2 are occupied at the transmission rate of two lines of the ODU-2 (20 Gbps) as the work line and the slots Nos. #3-#4 are occupied at the transmission rate of two lines of the ODU-2 (20 Gbps) as the protection line.

Further, in an OTU-3 ring network where the ODU-1 is multiplexed using 16 lines to form ODU-3, in the first optical fiber 51, the time slots Nos. #1-#8 are occupied at the transmission rate of eight lines of the ODU-1 (20 Gbps) as the work line and the slots Nos. #9-#16 are occupied at the transmission rate of eight lines of the ODU-1 (20 Gbps) as the protection line.

Similarly, in the second optical fiber 52, the time slots Nos. #1-#8 are occupied at the transmission rate of eight lines of the ODU-1 (20 Gbps) as the work line and the slots Nos. #9-#16 are occupied at the transmission rate of eight lines of the ODU-1 (20 Gbps) as the protection line.

In the above embodiment, it may become possible to switch the BLSR because the time slot Nos. of the time slot group of the work line and the time slot Nos. of the time slot group of the protection line to be assigned to the first optical fiber are set so as to correspond to the time slot Nos. of the time slot group of the work line and the time slot Nos. of the time slot group of the protection line to be assigned to the second optical fiber.

This is also because, if the time slot Nos. of the work line and the protection lines are set to be different from each other between the first optical fiber and the second optical fiber, it may be desired to determine whether the protection line is used as the protection line of another line.

Flowchart of First Embodiment

Figure 15B:
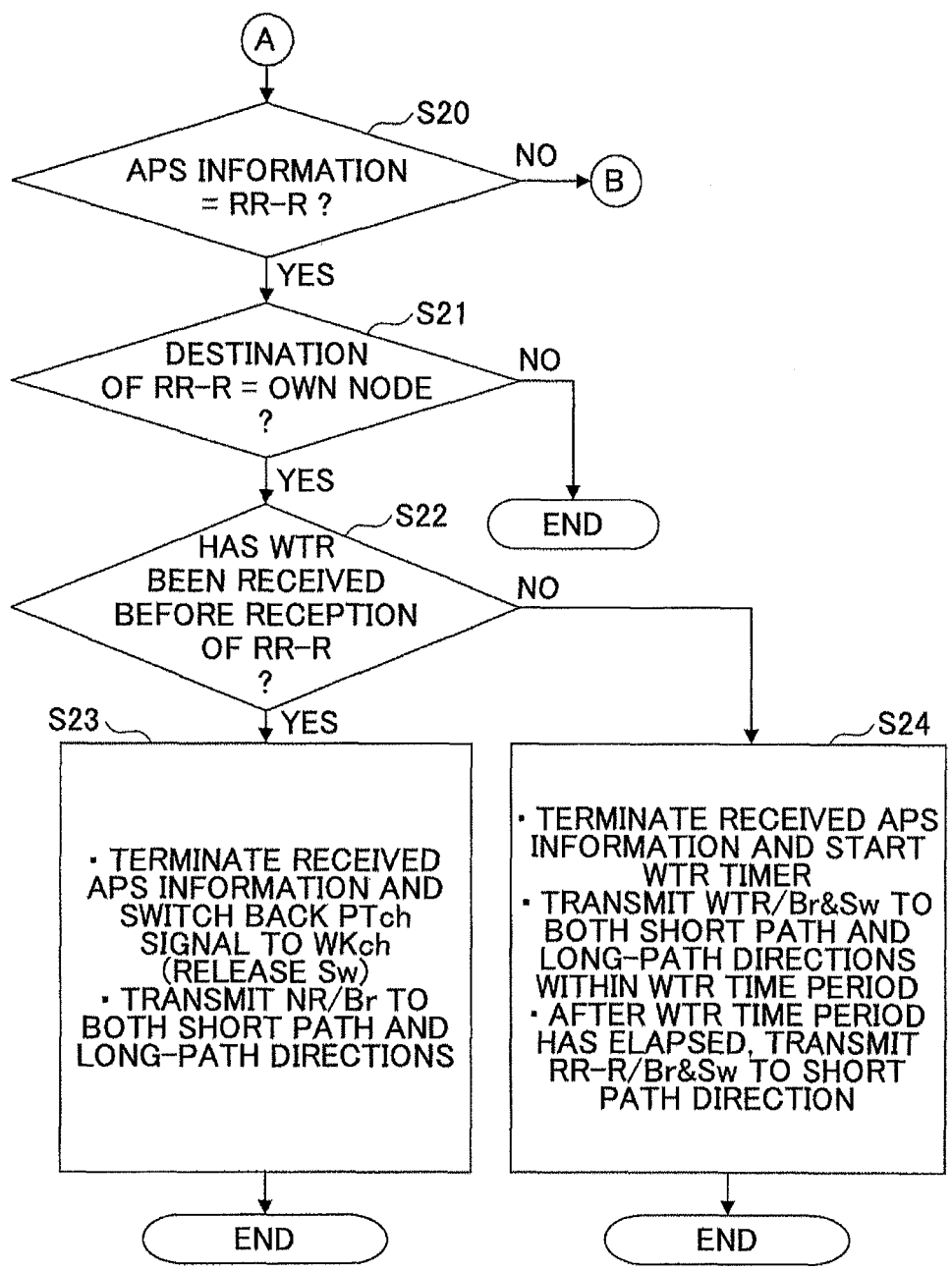

FIGS. 15A, 15B, and 16 collectively illustrate a flowchart of a process performed by the controller 35 according to the first embodiment. In FIG. 15A, in step S11, the controller 35 determines whether the optical receiver 22 detects abnormality such as a line cut or degradation of line quality. When determining that abnormality is detected, in step S12, the APS information of the SF-R/RDI (bit1-4 of Byte1/bit6-8 of Byte1) is transmitted to the node in the (short-path) direction where the abnormality is detected, and the APS information of the SF-R/IDLE is transmitted to the node in the (long-path) direction where no abnormality is detected. In step S12, the frames 8a, 8b, 9a, and 9b of FIG. 9 are transmitted.

Next, in step S12-1, it is determined whether the abnormality is restored. When determining that the abnormality is restored, in step S12-2, the APS information of the RR-R/Br&Sw is transmitted to the node in the (short-path) direction where the abnormality is restored, and the APS information of the SF-R/Br&Sw is transmitted to the node in the (long-path) direction where no abnormality is detected. On the other hand, when the abnormality is not restored in step S12-1, the process goes to step S13.

When determining that the abnormality is not restored, in step S13, it is determined whether the APS information is SF-R. When determining that the APS information (bit1-4 of Byte1) is SF-R, in step S14, it is determined whether the destination of the APS information (SF-R) is the own node. When determining that the destination of the APS information (SF-R) is the own node, in step S15, it is determined whether the APS information is from the long path.

When determining that the APS information is from the long path, in step S16, the received APS information is terminated and a channel (WKch) of the work line is switched to a channel (PTch) of protection line to transit to a Br&Sw state. Further, when the state is already in the Br&Sw state, the Br&Sw state is maintained. In step S16, the frames 10b and 11b of FIG. 10 are transmitted.

In step S14 when determining that the destination of the APS information (SF-R) is not the own node, in step S17, it is determined whether the APS information is IDLE. When determining that that the APS information is IDLE, in step S18, the APS information of SF-R is passed and the state of the own node is transited to the pass-through state.

When determining that the APS information is not IDLE, in step S17-1, it is determined whether the SPA information is Br&Sw. When determining that the SPA information is Br&Sw, in step S17-2, the APS information of SF-R is passed.

On the other hand, when determining that the APS information is not SF-R in step S13, in step S20, it is determined whether the received APS information is RR-R. When determining that the APS information is RR-R, in step S21, it is determined whether the destination of the APS information (RR-R) is the own node.

When determining that the destination of the APS information is the own node, in step S22, it is determined whether the WTR is received before the reception of the RR-R. When determining that the WTR is received before the reception of the RR-R, in step S23, the received APS information is terminated; the channel of the protection line is switched back to the channel of the work line; and the APS information of NR/Br is transmitted to both of the short path and the long path. In step S23, the frames 14a, 14b, 15a and 15b are transmitted.

When determining that the WTR is not received before the reception of the RR-R, in step S24, the received APS information is terminated and the WTR timer is started. Further, if it is within the restoration protection time WTR, the APS information of WTR/Br&Sw is transmitted to both of the short path and the long path. When the restoration protection time WTR has passed, the APS information of WTR/Br&Sw is transmitted to the short path. In step S24, the frames 12a, 12b, 13a, and 13b of FIG. 10 are transmitted.

Further, when determining that the received APS information is not RR-R in step S20, the process goes to step S25 of FIG. 16. In step S25, it is determined whether the received APS information is WTR. When determining that the received APS information is WTR, in step S26, it is determined whether the destination of the APS information (WTR) is the own node. When determining that the destination of the APS information (WTR) is the own node, in step S27, the received APS information is terminated and the WTR reception is stored. By doing this, when the RR-R is received next time, the step S23 is executed.

On the other hand, when determining that the APS information is not WTR in step S25, in step S28, it is determined whether the received APS information is NR. When determining that the received APS information is NR, in step S29, it is determined whether the APS information (bit6-8 of Byte1) is IDLE. When determining that the APS information is IDLE, in step S30, it is determined whether the current state of the own node is pass-through or Br&Sw.

When determining that the current state of the own node is pass-through or Br&SW, in step S31, the APS information of NR/IDLE is passed. Then, in step S32, it is determined whether the NR/IDLE is received from both of the short path and the long path. When determining that the NR/IDLE is received from both of the short path and the long path, in step S33, the state of the own node is transited to IDLE.

Further, when determined that the APS information is not IDLE, in step S34, it is determined whether the APS information is Br. When determining that the APS information is Br, in step S35, it is determined whether the destination of the APS information is the own node.

When determining that the destination of the APS information is the own node, in step S36, it is determined whether the APS information is received via the long path. When determining that the APS information is received via the long path, in step S37, the received APS information is terminated; the channel of the protection line is switched back to the channel of the work line; and the APS information of NR/IDLE is transmitted to both the short path and the long path. In step S37, the frames 5a, 5b, 6a, and 6b of FIG. 11 are transmitted.

Second Embodiment

Figure 17:
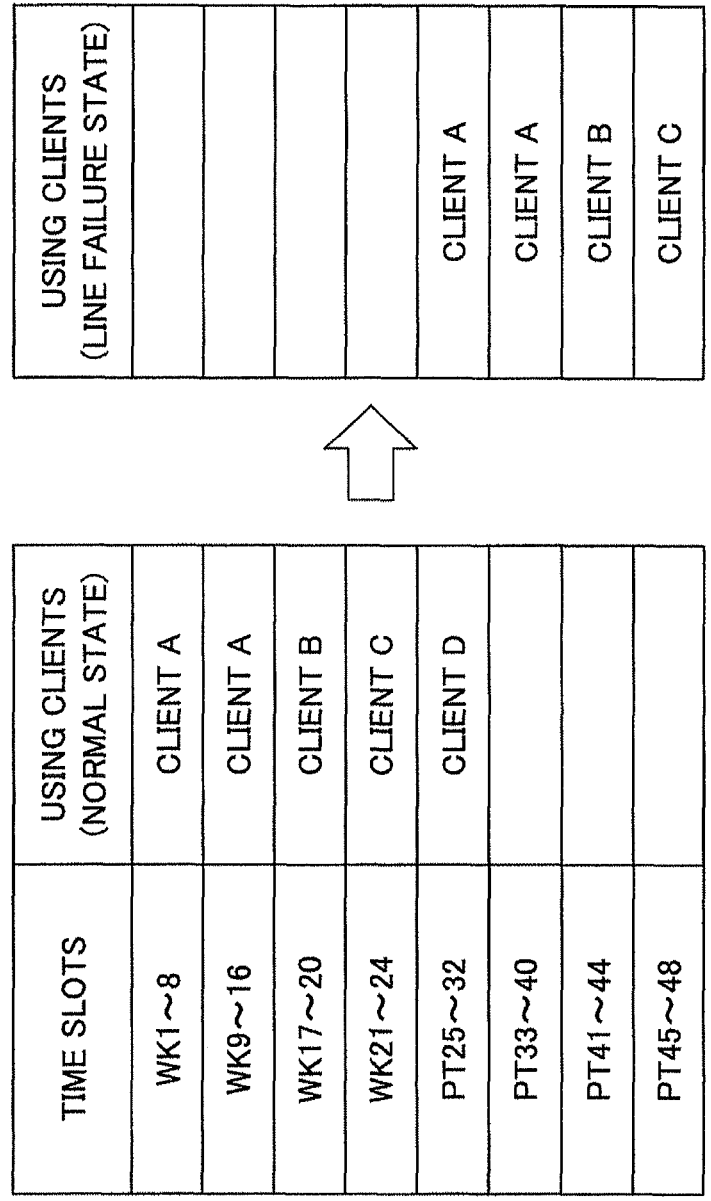

On the other hand, when a PCA (Protection Channel Access) function is used, as illustrated in FIG. 17, the time slots PT25-32 of the protection line may be used as the work line of a client D. Here, the time slots WK1-8 of the work line and the time slots WK9-16 of the work line are used by a client A, the time slots WK17-20 of the work line is used by a client B, and the time slots WK21-24 of the work line is used by a client C.

Under this state, when a failure occurs at one portion on the transport path of the ring network, as illustrated in FIG. 17, all the time slots PT25-48 of the protection line are used to relieve (back up) the time slots WK1-24 of the work line. Therefore, the signal of the client D using the time slots PT25-32 of the protection line is forcibly disposed (dropped) due to the failure on the transport path.

To resolve the problem, in this second embodiment, the TCM1 through TCM6 are allocated to the clients (ODUk paths); the relationship between the TCM1 through TCM6 and the time slots is registered in a database in the controller 35; and the priority levels are set for the TCM1 through TCM6.

FIG. 18 illustrates an example of the registration in the database of the controller 35. The time slots WK1-8 of the work line and the time slots WK9-16 of the work line are used by (the ODUk path of) the client A, the TCM1 is allocated to the client A, and the priority level of the TCM1 is set to 2. The time slots WK17-20 of the work line are used by (the ODUk path of) the client B, the TCM2 is allocated to the client B, and the priority level of the TCM2 is set to 3.

The time slots WK21-24 of the work line are used by (the ODUk path of) the client C, the TCM3 is allocated to the client C, and the priority level of the TCM3 is set to 4. The time slots WK25-32 of the protection line are used by (the ODUk path of) the client D, the TCM4 is allocated to the client D, and the priority level of the TCM4 is set to 1. Here, the smaller the value of the priority level, the higher the priority level.

Under this state, when a failure occurs at one portion on the transport path of the ring network, as illustrated in FIG. 18, the signal of the client D having the highest priority level is transmitted by using the time slots PT25-32 of the protection line.

Further, the time slots PT33-40 of the protection lines are used to relieve (back up) the time slots WK9-16 of the work line for the client A, the time slots PT41-44 of the protection lines are used to relieve (back up) the time slots WK17-20 of the work line for the client B, the time slots PT45-48 of the protection lines are used to relieve (back up) the time slots WK21-24 of the work line for the client C. Further, the signal of the client A using the time slots WK1-8 in a normal state is to be dropped.

Flowchart of Second Embodiment

Figure 19A:
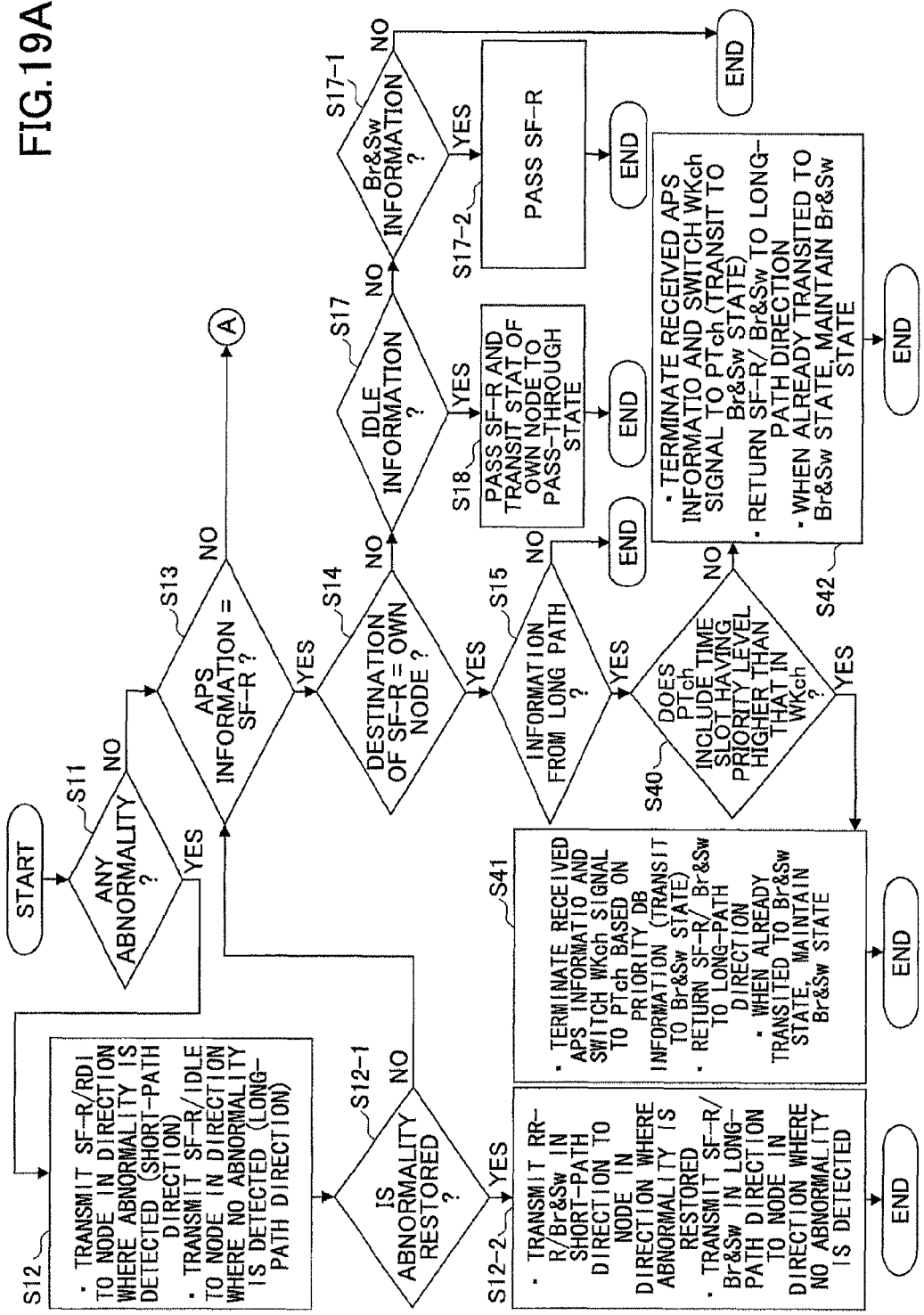
Figure 19B:
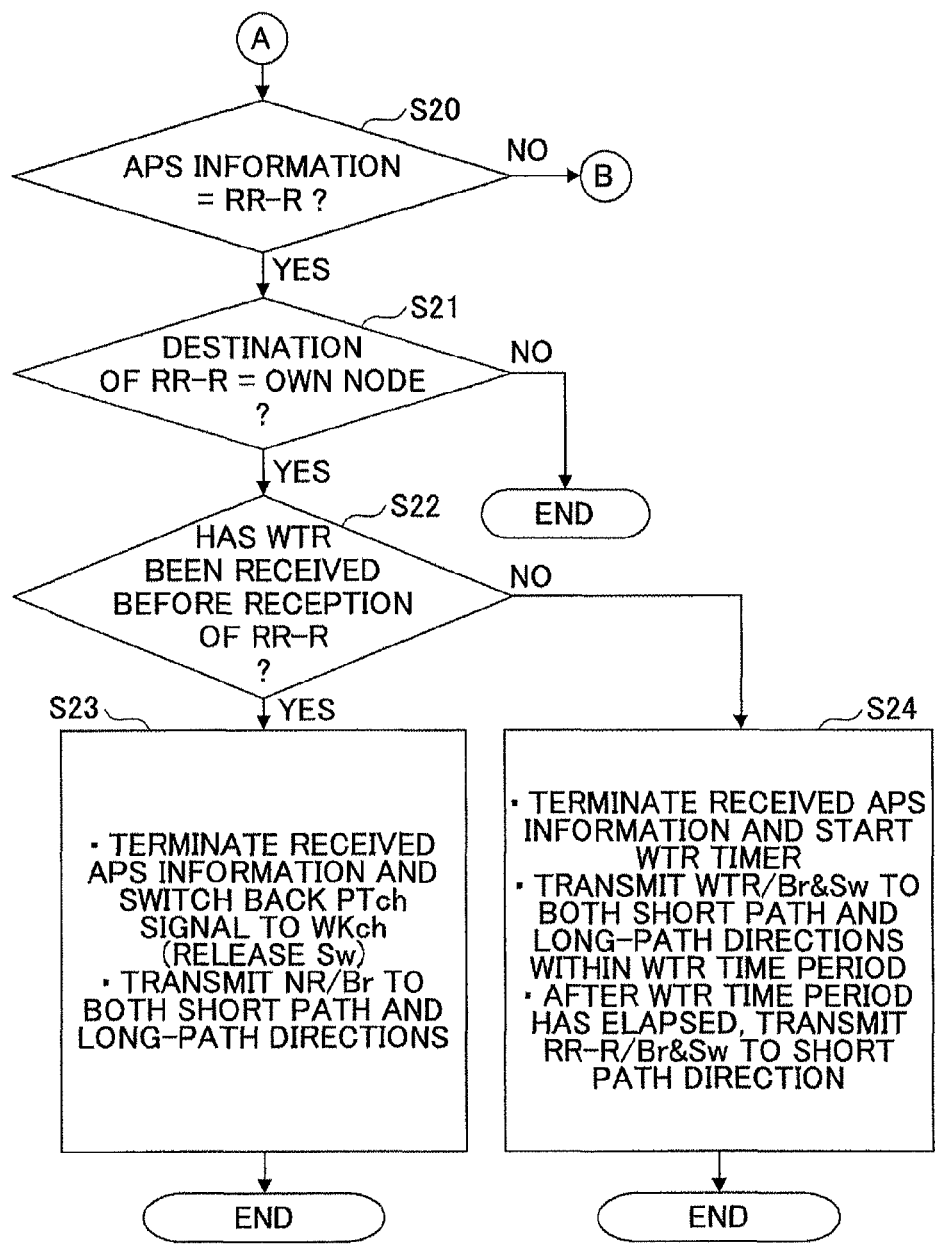

FIGS. 19A, 19B, and 20 collectively illustrate a flowchart of a process performed by the controller 35 according to the second embodiment. In FIGS. 19A, 19B, and 20, the same reference numerals are used to describe the same parts as in FIGS. 15A, 15B, and 16.

In FIG. 19A, in step S11, the controller 35 determines whether the optical receiver 22 detects abnormality such as line cut and degradation of line quality. When determining that abnormality is detected, in step S12, the APS information of the SF-R/RDI (bit1-4 of Byte1/bit6-8 of Byte1) is transmitted to the node in the (short-path) direction where the abnormality is detected, and the APS information of the SF-R/IDLE is transmitted to the node in the (long-path) direction where no abnormality is detected. In step S12, the frames 8a, 8b, 9a, and 9b of FIG. 9 are transmitted.

Next, in step S12-1, it is determined whether the abnormality is restored. When determining that the abnormality is restored, in step S12-2, the APS information of the RR-R/Br&Sw is transmitted to the node in the (short-path) direction where the abnormality is restored, and the APS information of the SF-R/Br&Sw is transmitted to the node in the (long-path) direction where no abnormality is detected. On the other hand, when the abnormality is not restored in step S12-1, the process goes to step S13.

When determining that the abnormality is not restored, in step S13, it is determined whether the APS information is SF-R. When determining that the APS information (bit1-4 of Byte1) is SF-R, in step S14, it is determined whether the destination of the APS information (SF-R) is the own node. When determining that the destination of the APS information (SF-R) is the own node, in step S15, it is determined whether the APS information is from the long path.

When determining that the APS information is from the long path, in step S40, it is determined whether, in a channel of the protection line, there is a time slot having a higher priority level than that in a channel of the work level.

When determining that, in a channel of the protection line, there is a time slot having a higher priority level than that in a channel of the work level, in step S41, the received APS information is terminated and the channels of the work line are switched to the channels of the protection line based on the priority-level information in the database, and the state is transited to the Br&Sw state. Further, the APS information of SF-R/Br&Sw is transmitted in the long-path direction. Further, when the state has been transited to the Br&Sw state already, the Br&Sw state is maintained.

When determining that, in a channel of the protection line, there is no time slot having a higher priority level than that in a channel of the work level, in step S42, the received APS information is terminated; the channel of the work line is switched to the channel of the protection line; and the state is transited to the Br&Sw state.

Further, the APS information of SF-R/Br&Sw is transmitted in the long-path direction. Further, when the state has been transited to the Br&Sw state already, the Br&Sw state is maintained. In steps S41 and S42, the frames 10b and 11b of FIG. 10 are transmitted.

In step S14 when determining that the destination of the APS information (SF-R) is not the own node, in step S17, it is determined whether the APS information is IDLE. When determining that that the APS information is IDLE, in step S18, the APS information of SF-R is passed and the state of the own node is transited to the pass-through state. When determining that the APS information is not IDLE, in step S17-1, it is determined whether the SPA information is Br&Sw. When determining that the SPA information is Br&Sw, in step S17-2, the APS information of SF-R is passed.

On the other hand, when determining that the APS information is not SF-R in step S13, in step S20, it is determined whether the received APS information is RR-R. When determining that the APS information is RR-R, in step S21, it is determined whether the destination of the APS information (RR-R) is the own node.

When determining that the destination of the APS information is the own node, in step S22, it is determined whether the WTR is received before the reception of the RR-R. When determining that the WTR is received before the reception of the RR-R, in step S23, the received APS information is terminated; the channel of the protection line is switched back to the channel of the work line; and the APS information of NR/Br is transmitted to both of the short path and the long path. In step S23, the frames 14a, 14b, 15a and 15b are transmitted.

When determining that the WTR is not received before the reception of the RR-R, in step S24, the received APS information is terminated and the WTR timer is started. Further, if it is within the restoration protection time WTR, the APS information of WTR/Br&Sw is transmitted to both the short path and the long path. When the restoration protection time WTR has passed, the APS information of WTR/Br&Sw is transmitted to the short path. In step S24, the frames 12a, 12b, 13a, and 13b of FIG. 10 are transmitted.

Further, when determining that the received APS information is not RR-R in step S20, the process goes to step S25 of FIG. 20. In step S25, it is determined whether the received APS information is WTR. When determining that the received APS information is WTR, in step S26, it is determined whether the destination of the APS information (WTR) is the own node.

When determining that the destination of the APS information (WTR) is the own node, in step S27, the received APS information is terminated and the WTR reception is stored. By doing this, when the RR-R is received next time, the step S23 is executed.

On the other hand, when determining that the APS information is not WTR in step S25, in step S28, it is determined whether the received APS information is NR. When determining that the received APS information is NR, in step S29, it is determined whether the APS information (bit6-8 of Byte1) is IDLE. When determining that the APS information is IDLE, in step S30, it is determined whether the current state of the own node is pass-through or Br&SW.

When determining that the current state of the own node is pass-through or Br&SW, in step S31, the APS information of NR/IDLE is passed. Then, in step S32, it is determined whether the NR/IDLE is received from both of the short path and the long path. When determining that the NR/IDLE is received from both of the short path and the long path, in step S33, the state of the own node is transited to IDLE.

Further, when determined that the APS information is not IDLE, in step S34, it is determined whether the APS information is Br. When determining that the APS information is Br, in step S35, it is determined whether the destination of the APS information is the own node. When determining that the destination of the APS information is the own node, in step S36, it is determined whether the APS information is received via the long path.

When determining that the APS information is received via the long path, in step S37, the received APS information is terminated; the channel of the protection line is switched back to the channel of the work line; and the APS information of NR/IDLE is transmitted to both of the short path and the long path. In step S37, the frames 5a, 5b, 6a, and 6b of FIG. 11 are transmitted.

Third Embodiment

Figure 21:
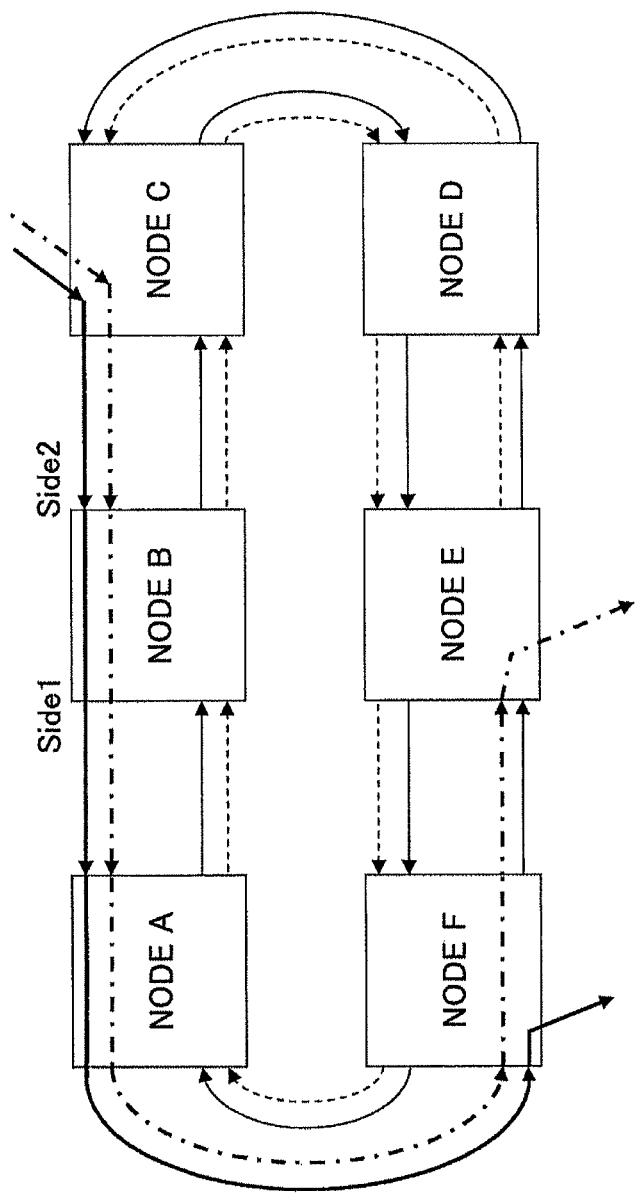

As illustrated in FIG. 21, in the ring network including six nodes (i.e., nodes A through F), a case is described where there is a path passing an OTN work line between node C and node F (via nodes A and B) and there is a path passing an OTN protection line between node C and node E (via nodes A, B, and F).

In the first embodiment, when a failure occurs between the nodes C and D, the node C detects SF (Signal Fail) on the receiving line from the node D and node C generates the APS information requesting SF-R and transmits the APS information to the node D. Finally, the state of the nodes C and D are transited to the ring-switch (loopback switching) state so that the protection line is used to relieve the work line between the nodes C and D. Therefore, the protection line which had passed signals in no-alarm condition between the nodes C and E will be disposed (dropped).

In the embodiment described below, the APS information of bit1, 2-3 of Byte4 is defined as illustrated in FIG. 6. By using the bit1, 2-3 of Byte4, it may become possible to prevent the disposal (Drop) of the protection line which had passed signals in no-alarm condition between the nodes C and E.

As illustrated in FIG. 21, a case is considered where there is a path passing the OTN work line between the nodes C and F (via the nodes A and B) and there is a path passing the OTN protection line between the nodes C and E (via the node A, B, and F).

When a failure occurs between the nodes C and D, the node C detects SF on the receiving line from node D, generates APS information requesting SF-R, and transmits the generated APS information to the node D. In this case, the node C does not have the cross-connection in the node D direction; therefore, the node C transmits the information which indicates that there is no cross-connection setting in the work line and the protection line by setting the bit1, 2-3 of Byte4 of the APS information as "1: Enhanced BLSR" and "00: None", respectively.

Upon receiving the APS information from the node C, the node D refers to the bit1, 2-3 of Byte4 of the received APS information and confirms that there is no cross-connection in the opposing node C. Further, the node D has detected nothing other than the failure between the nodes C, and there is no cross-connection for the work line to the node C. Therefore, the node D does not respond to the SF-R request, and does stop the ring switching operation. By doing this, the protection line between the nodes C and E may not be disposed (dropped) due to the ring switching. Therefore, it may become possible to improve the usage efficiency of the lines.

Figure 22:
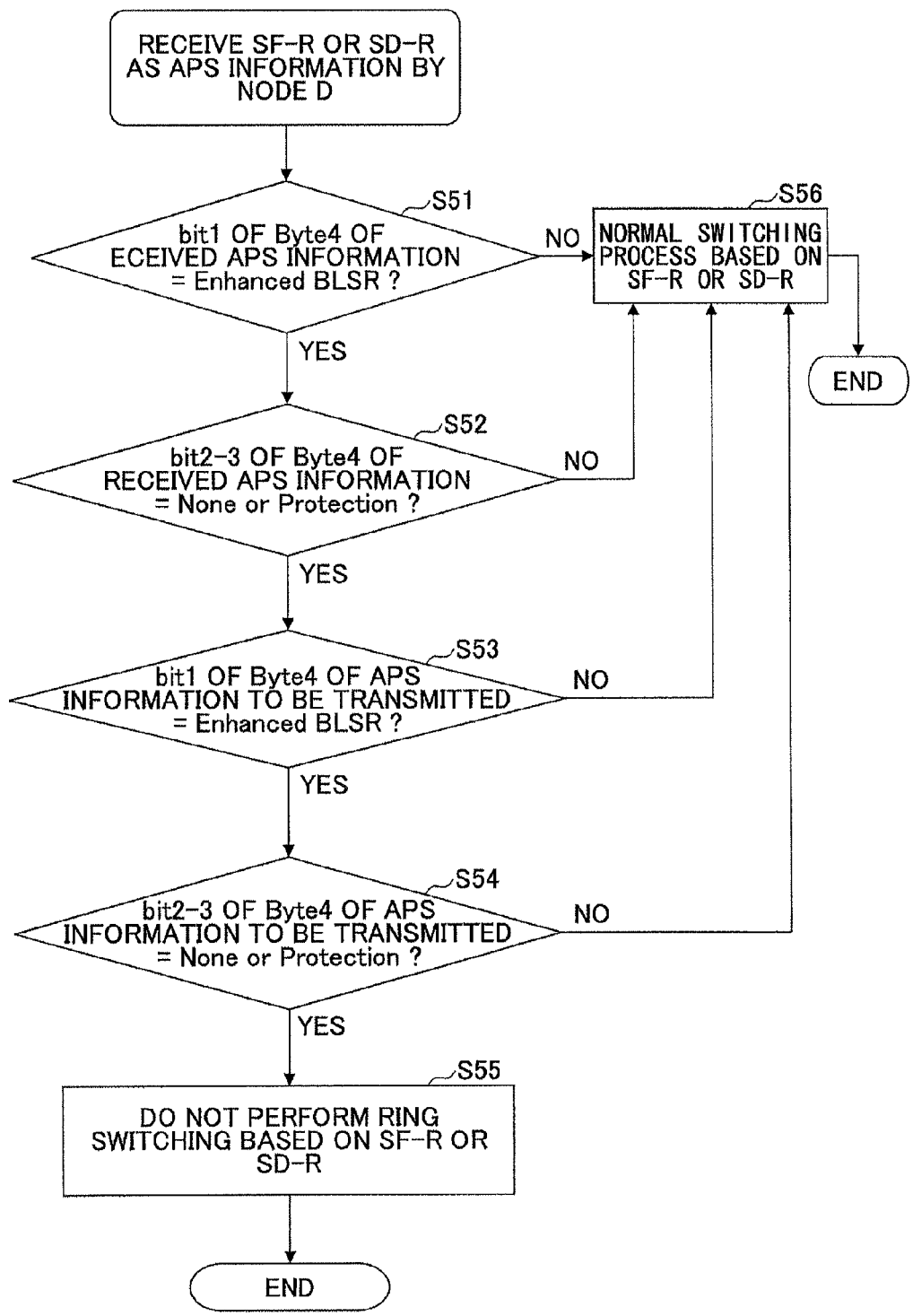

FIG. 22 is a flowchart of a process executed by the node D according to an embodiment. Upon receiving the APS information from the node C, in step S51, the node D determines whether the bit1 of Byte4 indicates "Enhanced BLSR". When determining that the bit1 of Byte4 indicates "Enhanced BLSR", in step S52, it is determined whether the bit2-3 of Byte4 indicates "None" or "Protection".

When determining that the bit2-3 of Byte4 indicates "None" or "Protection", in step S53, it is determined whether the bit1 of Byte4 to be transmitted by the own node indicates "Enhanced BLSR". When determining that the bit1 of Byte4 indicates "Enhanced BLSR", in step S54, it is determined whether the bit2-3 of Byte4 to be transmitted by the own node indicates "None" or "Protection".

When determining that the bit2-3 of Byte4 indicates "None" or "Protection", in step S55, the node D does not execute the ring switch due to the SF-R or SD-R. On the other hand, when any of the steps S51 through S54 is satisfied, in step S56, the node D executes the ring switch due to the SF-R or SD-R.

Figure 23:
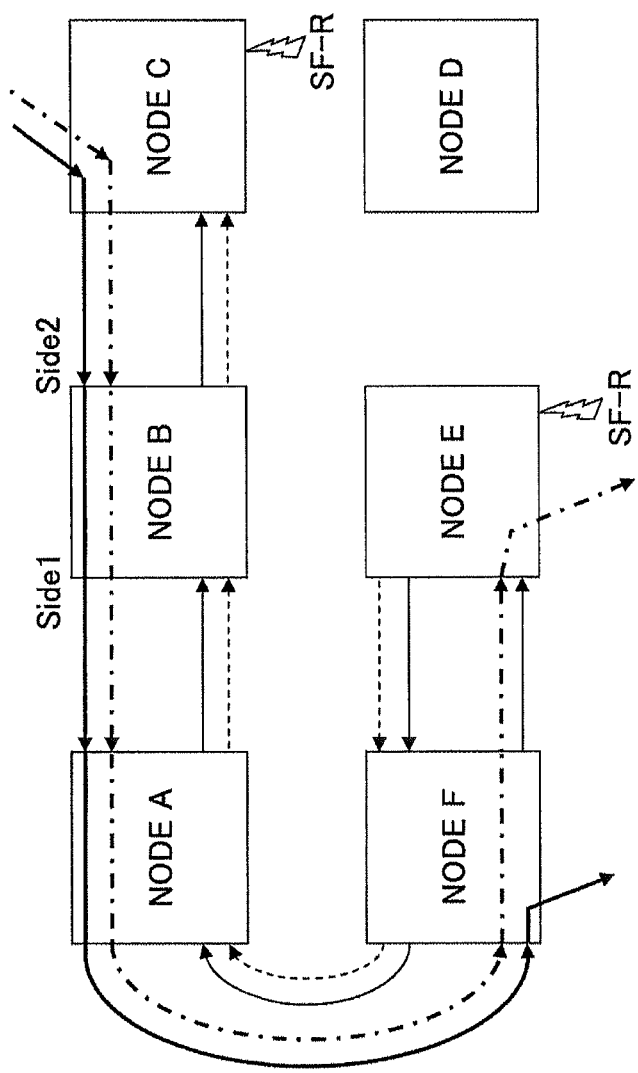

Further, according to the third embodiment, as illustrated in FIG. 23, when a ring network is not yet completed, namely when there are connections only between the nodes C, B, A, F, and E but no connections are formed yet between the nodes E and D and between the nodes D and C, it may become possible to perform the BLSR switching when desired by using only the connected nodes C, B, A, F, and E.

Figure 24:
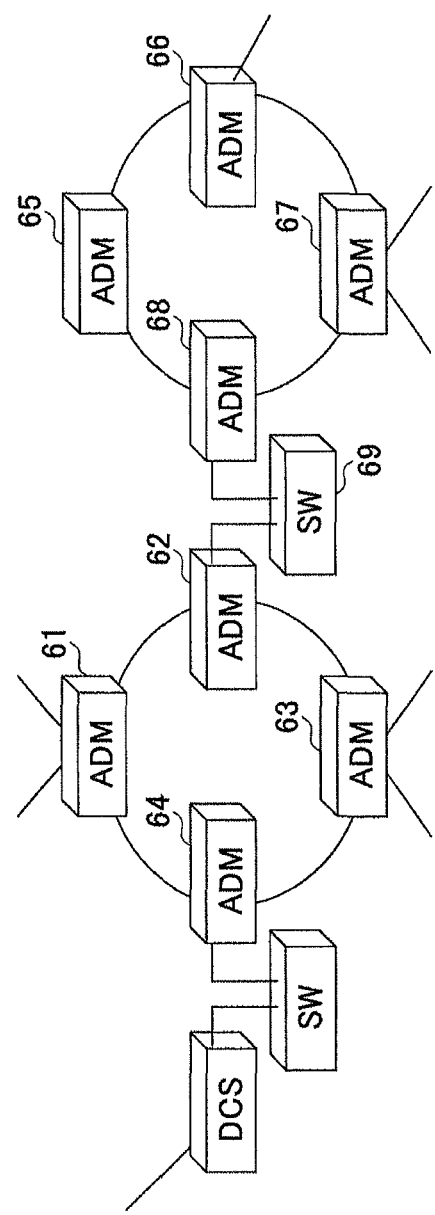

On the other hand, as illustrated in FIG. 24, a network may be formed by mutually connecting plural OTN networks. In FIG. 24, one OTN network is formed by connecting a first OTN ring network and a second OTN ring network by using a node device 69. The first OTN ring network includes node devices (ADMs) 61, 62, 63, and 64, and the second OTN ring network includes node devices (ADMs) 65, 66, 67, and 68.

By doing this, it may becomes possible to form an OTN-based ring network that communicates with client signals such as SONET, IP frames and the like more efficiently, more securely, and with a lower cost. Further, it may become possible to switch the lines in accordance with the priority levels. Further, it may become possible to continuously use the protection lines and communicate signals without unnecessarily switching lines.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the sprit and scope of the invention.

What is claimed is:

1. A node device in an optical transport ring network including plural node devices connected in a ring form using plural optical transmission paths so that optical transport frames of a working line and a protection line are transmitted using the plural optical transmission paths, the node device comprising:
   a control information transmitter configured to, when a failure occurs in an optical transmission path of the optical transmission paths, transmit the optical transport frame including switching control information to an opposing node device that is located opposite to the node device across the optical transmission path where the failure has occurred;
   a switcher configured to
      receive the optical transport frame that is destined for the node device and includes switching control information,
      form a loop back of the plural optical transmission paths, and
      switch the optical transmission path from the working line to the protection line; and
   a storage configured to store paths corresponding to plural sets of path monitoring information included in the optical transport frame in association with priority levels of the plural sets of path monitoring information,
   wherein when receiving the optical transport frame including the switching control information, the switcher switches the paths corresponding to the plural sets of path monitoring information from the working line to the protection line in accordance with the priority levels of the plural sets of path monitoring information stored in the storage;
   wherein the control information transmitter is configured to add, to the switching control information, cross-connection information indicating whether a cross-connection for the working line and the protection line is included in the node device and transmit the optical transport frame including the switching control information; and
   wherein the switcher is configured to stop switching the optical transmission path from the working line to the protection line when the optical transport frame destined for the node device is received from a source node device and includes the switching control information that includes the cross-connection information indicating that the cross-connection is not included in the source node device.

2. The node device according to claim 1,
wherein the optical transport frames are frames to which a client signal for at least one of a synchronous network and an asynchronous network is mapped.

3. A method performed by a node device in an optical transport ring network including plural node devices connected in a ring form using plural optical transmission paths so that optical transport frames of a working line and a protection line are transmitted using the plural optical transmission paths, the method comprising:
   when a failure occurs in an optical transmission path of the optical transmission paths, transmitting the optical transport frame including switching control information to an opposing node device that is located opposite to the node device across the optical transmission path where the failure has occurred; and
   when receiving the optical transport frame that is destined for the node device and includes switching control information, forming a loop back of the plural optical transmission paths, and switching the optical transmission path from the working line to the protection line, wherein
   the node device includes a storage that stores paths corresponding to plural sets of path monitoring information included in the optical transport frame in association with priority levels of the plural sets of path monitoring information;
   when receiving the optical transport frame including the switching control information, the node device switches the paths corresponding to the plural sets of path monitoring information from the working line to the protection line in accordance with the priority levels of the plural sets of path monitoring information stored in the storage;
   the switching control information includes cross-connection information indicating whether a cross-connection for the working line and the protection line is included in the node device; and
   the node device stops switching the optical transmission path from the working line to the protection line when the optical transport frame destined for the node device is received from a source node device and includes the switching control information that includes the cross-connection information indicating that the cross-connection is not included in the source node device.

4. The method according to claim 3,
wherein the optical transport frames are frames to which a client signal for at least one of a synchronous network and an asynchronous network is mapped.

* * * * *